(12) United States Patent
Han et al.

(10) Patent No.: US 12,041,116 B2
(45) Date of Patent: Jul. 16, 2024

(54) ELECTRONIC DEVICE FOR FILE TRANSFER AND OPERATING METHOD THEREOF

(71) Applicant: Samsung Electronics Co., Ltd., Suwon-si (KR)

(72) Inventors: Kyujin Han, Suwon-si (KR); Yeungseob Shin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/733,544

(22) Filed: Apr. 29, 2022

(65) Prior Publication Data

US 2022/0385722 A1 Dec. 1, 2022

Related U.S. Application Data

(63) Continuation of application No. PCT/KR2022/004976, filed on Apr. 6, 2022.

(30) Foreign Application Priority Data

May 28, 2021 (KR) ........................ 10-2021-0069382

(51) Int. Cl.
*G06F 15/16* (2006.01)
*H04L 67/06* (2022.01)

(52) U.S. Cl.
CPC .................................. *H04L 67/06* (2013.01)

(58) Field of Classification Search
CPC ......... H04L 67/06; H04L 51/04; H04L 67/02; H04L 67/561
See application file for complete search history.

(56) References Cited

U.S. PATENT DOCUMENTS

| 9,924,042 B2 | 3/2018 | Regan |
| 11,070,659 B2 | 7/2021 | Liu |
| 2004/0249768 A1* | 12/2004 | Kontio ............... G06Q 20/3674 705/65 |
| 2007/0016429 A1* | 1/2007 | Bournas ................ G06Q 10/06 700/91 |

(Continued)

FOREIGN PATENT DOCUMENTS

| CN | 108337215 A | 7/2018 |
| KR | 10-2008-0030906 A | 4/2008 |

(Continued)

OTHER PUBLICATIONS

International Search Report dated Jul. 8, 2022, issued in International Patent Application No. PCT/KR2022/004976.

*Primary Examiner* — Dustin Nguyen
*Assistant Examiner* — Hao H Nguyen
(74) *Attorney, Agent, or Firm* — Jefferson IP Law, LLP

(57) ABSTRACT

An electronic device is provided. The electronic device includes communication circuitry and a processor operatively connected to the communication circuitry. The processor may transmit, to a first server, at least one file to be transmitted to another electronic device through the communication circuitry, may receive, from the first server, a message body related to the at least one file, may generate a message by adding, to the message body, information related to at least one file function, and may transmit the message to the other electronic device through the communication circuitry.

16 Claims, 17 Drawing Sheets

(56) References Cited

U.S. PATENT DOCUMENTS

| | | | |
|---|---|---|---|
| 2008/0045140 A1* | 2/2008 | Korhonen | H04M 1/72412 455/3.06 |
| 2008/0307062 A1* | 12/2008 | Wang | H04L 51/063 709/206 |
| 2010/0178864 A1* | 7/2010 | Chow | G06Q 30/04 455/3.06 |
| 2011/0123176 A1* | 5/2011 | Fujiwara | H04N 5/913 386/E9.011 |
| 2013/0080573 A1* | 3/2013 | Boliek | H04L 63/08 709/217 |
| 2013/0091280 A1* | 4/2013 | Rajakarunanayake | H04L 67/306 709/225 |
| 2013/0124868 A1* | 5/2013 | Sorotokin | G06F 21/10 713/176 |
| 2014/0023183 A1* | 1/2014 | Brown | H04L 51/56 379/93.17 |
| 2015/0058398 A1* | 2/2015 | Moncomble | H04L 67/51 709/202 |
| 2015/0106175 A1* | 4/2015 | Kang | H04W 4/80 705/14.4 |
| 2016/0103652 A1* | 4/2016 | Kuniansky | H04L 65/00 700/94 |
| 2016/0286027 A1* | 9/2016 | Lee | H04M 1/72436 |
| 2017/0041265 A1* | 2/2017 | Simpson | H04L 51/52 |
| 2017/0070456 A1* | 3/2017 | Norhammar | H04L 65/765 |
| 2020/0220905 A1 | 7/2020 | Park et al. | |
| 2021/0012339 A1* | 1/2021 | Rafferty | G06Q 20/3223 |
| 2021/0234813 A1* | 7/2021 | Narayan | H04L 51/21 |

FOREIGN PATENT DOCUMENTS

| | | |
|---|---|---|
| KR | 10-2015-0026217 A | 3/2015 |
| KR | 10-2016-0113833 A | 10/2016 |
| KR | 10-2020-0084614 A | 7/2020 |
| KR | 10-2237924 B1 | 4/2021 |

* cited by examiner

ELECTRONIC DEVICE FOR FILE TRANSFER AND OPERATING METHOD THEREOF

CROSS-REFERENCE TO RELATED APPLICATION(S)

This application is a continuation application, claiming priority under § 365(c), of an International application No. PCT/KR2022/004976, filed on Apr. 6, 2022, which is based on and claims the benefit of a Korean patent application number 10-2021-0069382, filed on May 28, 2021, in the Korean Intellectual Property Office, the disclosure of which is incorporated by reference herein in its entirety.

TECHNICAL FIELD

The disclosure relates to a device and method for a file transfer in an electronic device.

BACKGROUND ART

With the development of the information communication technology and the semiconductor technology, various electronic devices develop into multimedia devices which provide various multimedia services. The multimedia services may include at least one of voice call services, message services, broadcasting services, wireless Internet services, camera services, electronic payment services or music playback services.

An electronic device may provide a user with various communication functions through a rich communication suite (RCS). The RCS may integrate and provide functions, such as image sharing, message transfer or file sharing, in addition to a voice call over a communication network.

The above information is presented as background information only to assist with an understanding of the disclosure. No determination has been made, and no assertion is made, as to whether any of the above might be applicable as prior art with regard to the disclosure.

DISCLOSURE

Technical Problem

An electronic device may share a file with at least another electronic device through a rich communication suite (RCS). For example, the electronic device may transmit, to another electronic device, at least one file and/or a thumbnail related to the file.

An electronic device requires various file transfer methods capable of satisfying various needs of a user in addition to a file transfer method of transmitting, to another electronic device, a file and/or a thumbnail related to the file.

Aspects of the disclosure are to address at least the above-mentioned problems and/or disadvantages and to provide at least the advantages described below. Accordingly, an aspect of the disclosure is to provide a device and method for a file transfer in an electronic device.

Additional aspects will be set forth in part in the description which follows and, in part, will be apparent from the description, or may be learned by practice of the presented embodiments.

Technical Solution

In accordance with an aspect of the disclosure, an electronic device is provided. The electronic device includes communication circuitry, and a processor operatively connected to the communication circuitry. The processor may transmit, to a first server, at least one file to be transmitted to another electronic device through the communication circuitry, may receive, from the first server, a message body related to the at least one file, may generate a message by adding, to the message body, information related to at least one file function, and may transmit the message to the other electronic device through the communication circuitry.

In accordance with another aspect of the disclosure, an operating method of an electronic device is provided. The operating method includes transmitting, to a first server, at least one file to be transmitted to another electronic device, receiving, from the first server, a message body related to the at least one file, generating a message by adding, to the message body, information related to at least one file function, and transmitting the message to the other electronic device.

Advantageous Effects

According to various embodiments of the disclosure, various functions related to a file transfer to another electronic device can be additionally provided in a way that an electronic device adds information related to a file function (e.g., a file transfer function and/or a file control function) to the body of a message related to a file received from a content server and transmits the message to the other electronic device.

Other aspects, advantages, and salient features of the disclosure will become apparent to those skilled in the art from the following detailed description, which, taken in conjunction with the annexed drawings, discloses various embodiments of the disclosure.

DESCRIPTION OF DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

MODE FOR DISCLOSURE

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
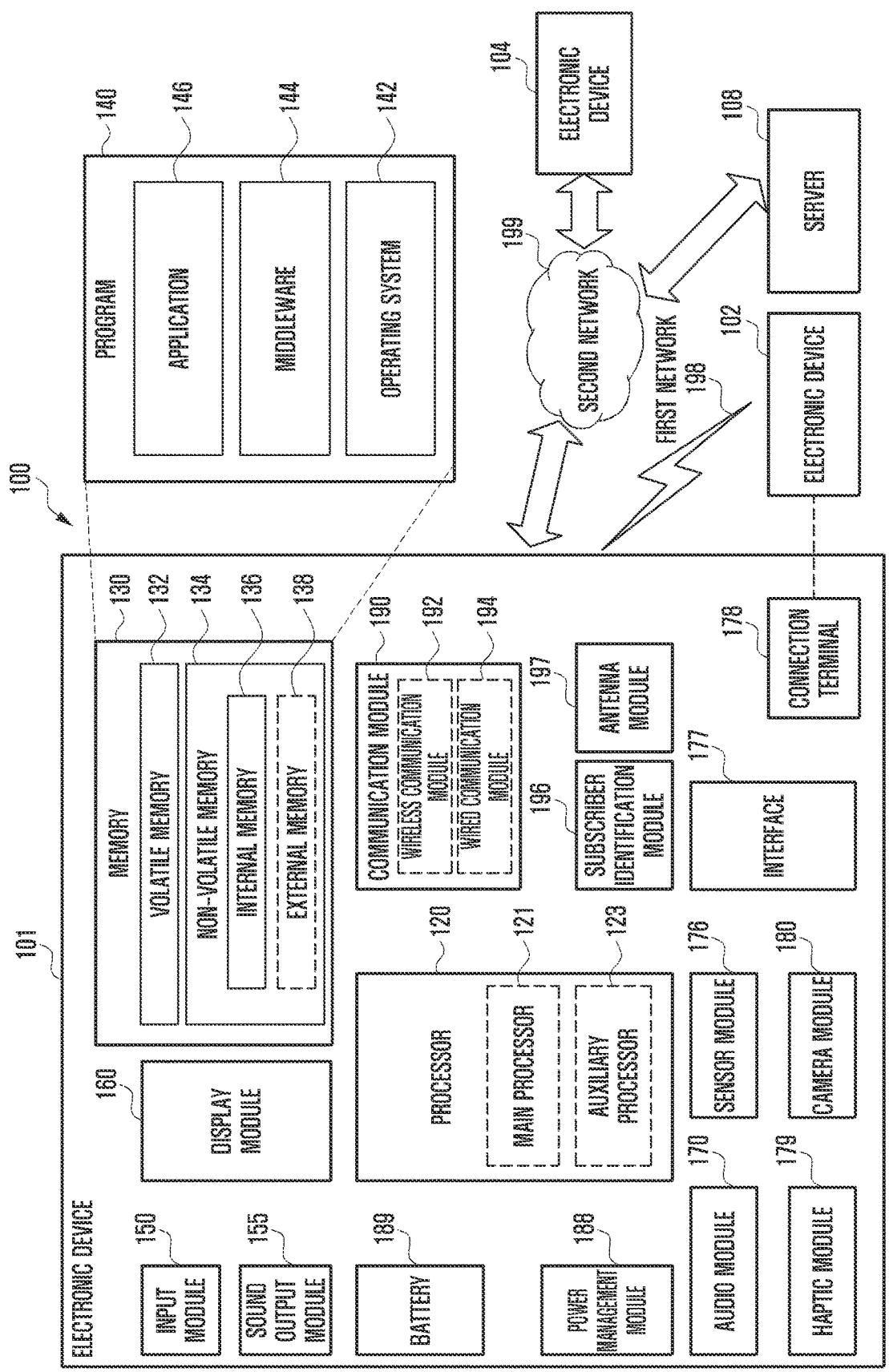
FIG. 1 is a block diagram of an electronic device within a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ Wi-Fi direct, or infrared data association (IrDA)) or the second network 199 (e.g., a long-range communication network, such as a legacy cellular network, a 5th generation (5G) network, a next-generation communication network, the Internet, or a computer network (e.g., LAN or wide area network (WAN))). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4th generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band. For example, the plurality of antennas may include a patch array antenna and/or a dipole array antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. It is intended that features described with respect to separate embodiments, or features recited in separate claims, may be combined unless such a combination is explicitly specified as being excluded or such features are incompatible. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively," as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
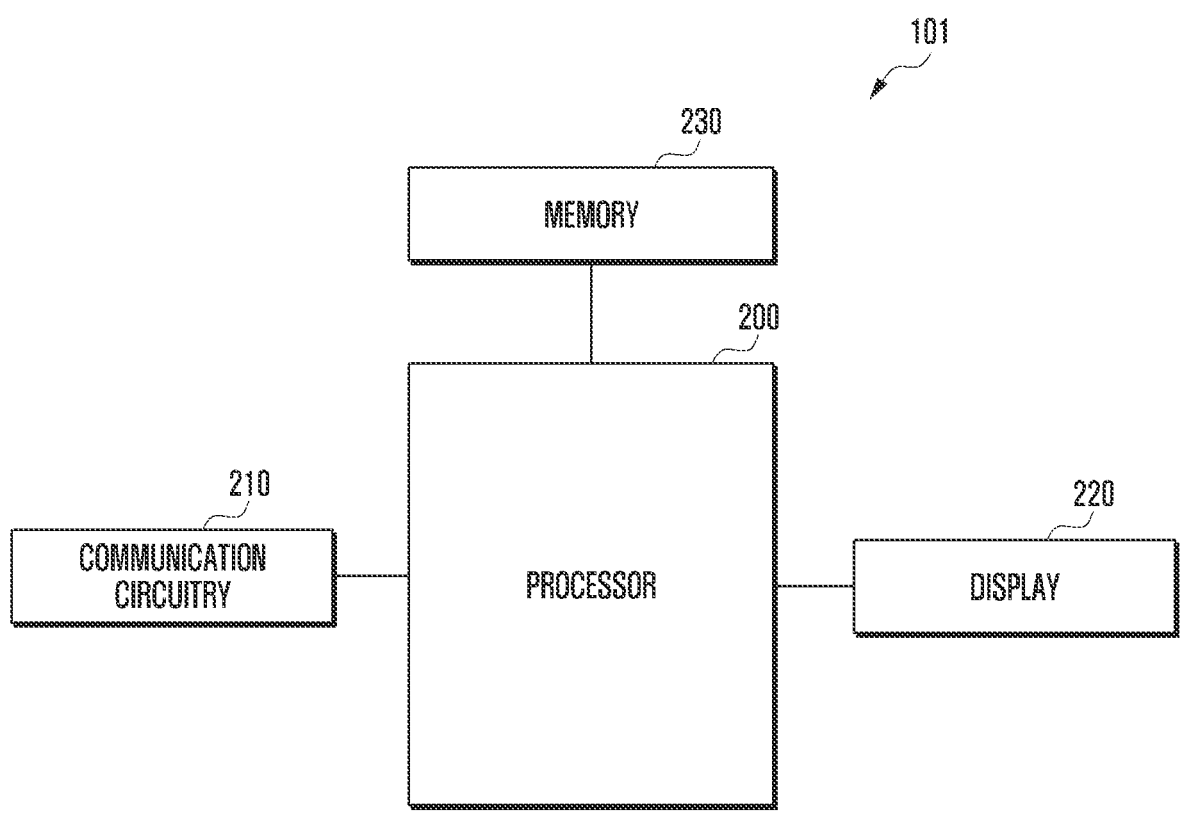
FIG. 2 is a block diagram of an electronic device for a file transfer according to an embodiment of the disclosure.

FIG. 2 is a block diagram of an electronic device for a file transfer according to an embodiment of the disclosure.

According to an embodiment, an electronic device 101 in FIG. 2 may be at least partially similar to an electronic device 101 in FIG. 1, or may further include other embodiments of the electronic device.

Referring to FIG. 2, the electronic device 101 may include a processor 200, communication circuitry 210, a display 220 and/or a memory 230. According to an embodiment, the processor 200 may be substantially identical with the processor 120 in FIG. 1 or may include the processor 120. According to an embodiment, the communication circuitry 210 may be substantially identical with the communication module 190 in FIG. 1 or may include the communication module 190. According to an embodiment, the display 220 may be substantially identical with the display module 160 in FIG. 1 or may include the display module 160. According to an embodiment, the memory 230 may be substantially identical with the memory 130 in FIG. 1 or may include the memory 130.

According to various embodiments, the processor 200 may be operatively connected to the communication circuitry 210, the display 220 and/or the memory 230.

According to various embodiments, the processor 200 may access a content server for a message (or a file) transfer. According to an embodiment, the processor 200 may control the communication circuitry 210 to transmit an access request message (e.g., a hyper-text transfer protocol (HTTP) POST request) to the content server based on an event related to a message (or a file) transfer. For example, the access request message may not include a message body. According to an embodiment, when receiving an authentication request message (e.g., HTTP 401 AUTHENTICATION REQUIRED) as a response to the access request message, the processor 200 may perform an authentication procedure with the content server. For example, the processor 200 may control the communication circuitry 210 to transmit an access request message (e.g., HTTP POST request), including an authentication header field, to the content server based on the authentication request message. For example, when receiving a message related to an authentication success as a response to the access request message including the authentication header field, the processor 200 may identify that the processor 200 has accessed the content server. According to an embodiment, when receiving a response message (e.g., HTTP 204 NO CONTENT) not requiring authentication as a response to the access request message, the processor 200 may identify that the processor 200 has accessed the content server. For example, the content server may include a hyper-text transfer protocol (HTTP) content server. For example, the event related to message transfer may be generated based on the execution of a message application program.

According to various embodiments, the processor 200 may identify the capability of another electronic device for a message (or a file) transfer. According to an embodiment, the processor 200 may obtain, from a separate rich communication suite (RCS) server, information related to the capability of another electronic device to which a message (or a file) will be transmitted. For example, the separate RCS server may include an RCS application server or a presence server.

According to an embodiment, the processor 200 may control the communication circuitry 210 to transmit information related to the capability of the electronic device 101 to the separate RCS server. For example, when initially accessing the separate RCS server, the processor 200 may control the communication circuitry 210 to transmit information related to the capability of the electronic device 101 to the separate RCS server. For example, when the capability of the electronic device 101 is changed, the processor 200 may control the communication circuitry 210 to transmit information related to the capability of the electronic device 101 to the separate RCS server.

According to various embodiments, the processor 200 may identify at least one file and/or a file function related to the at least one file to be transmitted to another electronic device (e.g., the electronic device 102 or 104 in FIG. 1). According to an embodiment, the processor 200 may select at least one file to be transmitted to another electronic device among multiple files stored in the memory 230, based on input information obtained through an input device (not illustrated) of the electronic device 101.

According to an embodiment, the processor 200 may identify at least one file function which is available to transmit at least one file to another electronic device based on information related to the capability of the other electronic device to which a message (or a file) will be transmitted among multiple file functions. For example, the available at least one file function may include at least one file function identified as being supported by the other electronic device based on the capability of the other electronic device among the multiple file functions. For example, the processor 200 may select at least one file function of at least one file function which is available to transmit at least one file to another electronic device based on input information obtained through an input device (not illustrated) of the electronic device 101. For example, the multiple file functions may include file functions supportable by the electronic device 101. For example, the file function may include a file transfer function for transmitting at least one file to another electronic device by using an internet protocol (IP) multimedia subsystem (IMS)-based message and/or a file control function for controlling the configuration of a file. For example, the file transfer function may include a bundle transfer function for constituting multiple files as one bundle and transmitting the multiple files at a time and/or a compression transfer function for compressing and transmitting at least one file. For example, the file control function may include a deadline setting up function (or a deadline restriction function) for setting up a valid time of a file, a copy restriction function for restricting the copy of a file and/or a deletion restriction function for restricting the deletion of a file. For example, the IMS-based message is a message standardized in order to provide communication services based on the IMS, and may include a rich communication suite or a rich communication service (RCS) message. For example, a file may include a video file, an audio file, an image file, a text file and/or a compression file.

According to an embodiment, the processor 200 may select at least one file function among multiple file functions based on input information obtained through an input device (not illustrated) of the electronic device 101. The processor 200 may identify whether at least one file function is available based on information related to the capability of another electronic device to which a message (or a file) will be transmitted. For example, when identifying that at least one file function is available, the processor 200 may identify that the selection of the at least one file function to be used to transmit at least one file to another electronic device has been completed. For example, when identifying that at least one file function is unavailable, the processor 200 may control the display 220 to output information related to use restriction on the at least one file function. For example, when identifying that at least one file function is unavailable, the processor 200 may select at least another function related to at least one function based on a file transfer history and/or information related to the capability of another electronic device.

According to various embodiments, the processor 200 may generate a message including at least one file to be transmitted to another electronic device (e.g., the electronic device 102 or 104 in FIG. 1) and/or a file function related to the at least one file. According to an embodiment, the processor 200 may control the communication circuitry 210 to transmit, to a content server, at least one file to be transmitted to another electronic device (e.g., the electronic device 102 or 104 in FIG. 1). For example, the processor 200 may control the communication circuitry 210 to transmit, to a content server, at least one file and thumbnail information related to the at least one file. According to an embodiment, the processor 200 may receive, from a content server, a message body (e.g., xml body) related to at least one file through the communication circuitry 210. For example, the message body may include an address (e.g., a uniform resource locator (URL)) related to a file (or a thumbnail), the size of a file (or a thumbnail) and/or the type of file (or thumbnail).

According to an embodiment, the processor 200 may add information related to at least one file function to a message body related to the at least one file. For example, the processor 200 may generate a message (e.g., a file transfer (FT) message) by adding information related to at least one file function to a message body related to the at least one file received from a content server. For example, the processor 200 may add information related to the at least one file function to a name space of a message body. For example, the processor 200 may add information related to the at least one file function to a file information tag (file-info tag) of a message body. For example, the processor 200 may add information related to the at least one file function to a file tag of a message body.

According to various embodiments, the processor 200 may control the communication circuitry 210 to transmit, to another electronic device (e.g., the electronic device 102 or 104 in FIG. 1), a message (e.g., a file transfer message) including at least one file and/or a file function related to the at least one file. According to an embodiment, the processor 200 may control the communication circuitry 210 to transmit, to another electronic device, a message (e.g., a file transfer message) including at least one file and/or a file function related to the at least one file through a transmission server based on a message session relay protocol (MSRP) or a session initiation protocol (SIP). For example, the transmission server may include an IMS server and/or a messaging application server.

According to various embodiments, the communication circuitry 210 may support the transmission and/or reception of a signal between the electronic device 101 and an external device (e.g., a content server, a transmission server, a separate RCS server and/or another electronic device). According to an embodiment, the communication circuitry 210 may include a wireless communication module (e.g., the wireless communication module 192 in FIG. 1) supporting that a signal is transmitted to and/or received from an external device by using a wireless resource.

According to various embodiments, the display 220 may display information processed in the electronic device 101. According to an embodiment, the display 220 may display information related to a message (e.g., a file transfer message) transmitted by another electronic device and/or a message received from another electronic device based on control of the processor 200. For example, information related to a message may include at least one of reception notification information of the message, the contents of the message, or information related to a file included in the message.

According to various embodiments, the memory 230 may store various data used by at least one component (e.g., the processor 200, the communication circuitry 210 and/or the display 220) of the electronic device 101. According to an embodiment, the data may include information related to multiple files and/or multiple file functions. According to an embodiment, the memory 230 may store various instructions executable through the processor 200.

According to various embodiments, the electronic device 101 may receive a message (e.g., a file transfer message) from another electronic device. According to an embodiment, the processor 200 may receive a message from another electronic device through the communication circuitry 210. The processor 200 may detect information related to a file (or a thumbnail) in a message received from another electronic device. According to an embodiment, the processor 200 may receive at least one file (or thumbnail) from a content server based on information related to a file (or a thumbnail). According to an embodiment, the processor 200 may control the display 220 to display at least one file (or thumbnail) based on a file function identified in a message.

According to various embodiments, an electronic device (e.g., the electronic device 110 in FIG. 1 or 2) may include communication circuitry (e.g., the communication module 190 in FIG. 1 or the communication circuitry 210 in FIG. 2); and a processor (e.g., the processor 120 in FIG. 1 or the processor 200 in FIG. 2) operatively connected to the communication circuitry. The processor may transmit, to a first server, at least one file to be transmitted to another electronic device through the communication circuitry, may receive, from the first server, a message body related to the at least one file, may generate a message by adding information related to at least one file function to the message body, and may transmit the message to the other electronic device through the communication circuitry.

According to various embodiments, the first server may include a hypertext transfer protocol (HTTP) content server.

According to various embodiments, the processor may receive, from the first server, a message body including at least one of address information related to at least one file, information related to the size of the file or information related to the type of file.

According to various embodiments, the processor may add, to a name space of the message body, the information related to the at least one file function.

According to various embodiments, the processor may add the information related to the at least one file function to the message body in the form of a file tag.

According to various embodiments, the processor may add the information related to the at least one file function to the message body in the form of a file information tag.

According to various embodiments, the electronic device may further include a display (e.g., the display module 160 in FIG. 1 or the display 220 in FIG. 2). The processor may identify the capability of another electronic device through an RCS application server or a presence server, may identify at least one file function supported by the other electronic device among multiple file functions supported by the electronic device based on the capability of the other electronic device, and may display, on the display, a file function list including the at least one file function supported by the other electronic device.

According to various embodiments, the processor may select the at least one file function related to the at least one file in the file function list displayed on the display.

According to various embodiments, the message may include the IMS-based message.

According to various embodiments, the processor may transmit the message to the other electronic device through a second server.

Figure 3:
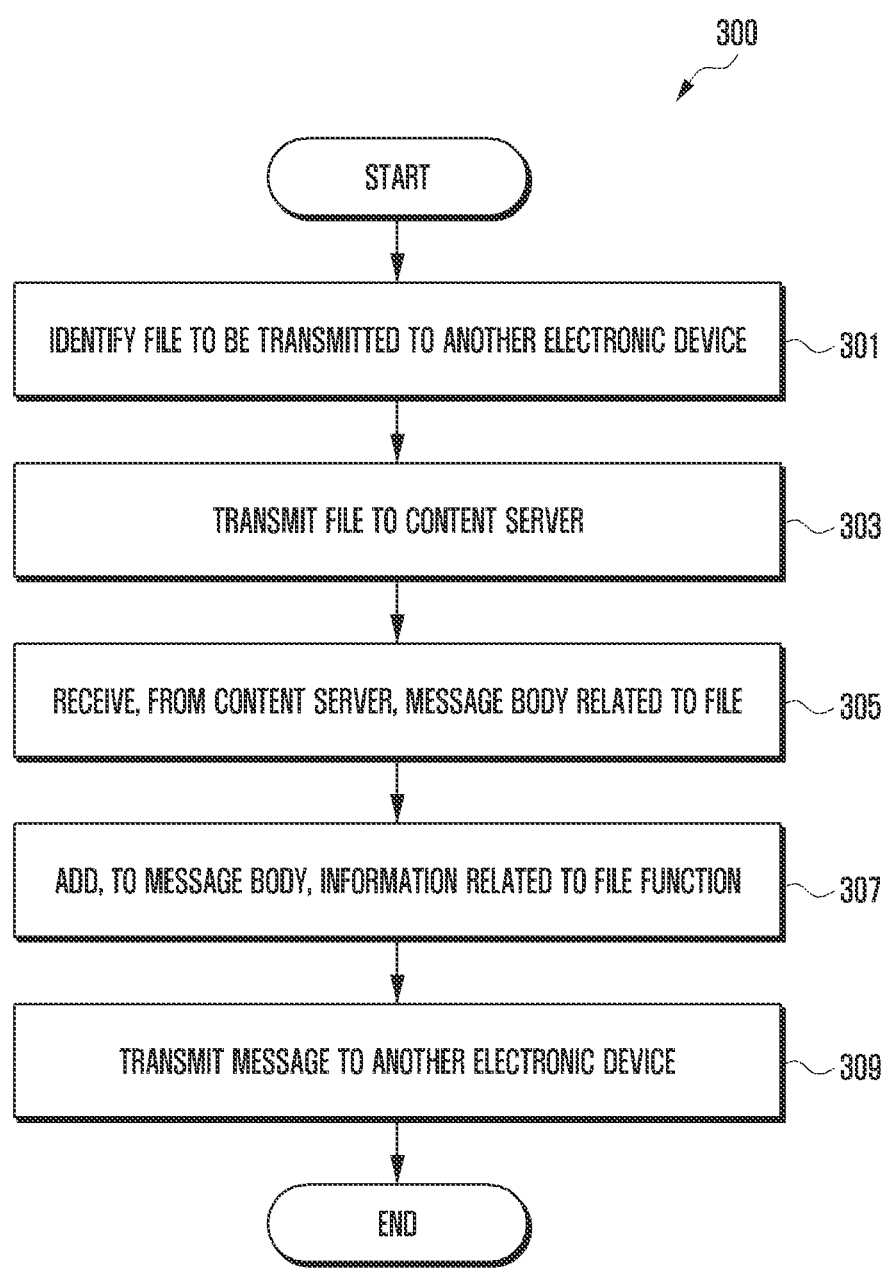
FIG. 3 is a flowchart for transmitting a file in an electronic device according to an embodiment of the disclosure.

FIG. 3 is a flowchart for transmitting a file in an electronic device according to an embodiment of the disclosure. In the following embodiments, operations may be sequentially performed, but are not essentially sequentially performed. For example, the order of the operations may be changed, and at least two of the operations may be performed in parallel. For example, the electronic device in FIG. 3 is a transmission device that transmits a message, and may be the electronic device 101 in FIG. 1 or 2.

Referring to FIG. 3 depicting flowchart 300, in operation 301, an electronic device (e.g., a processor 120 in FIG. 1 or a processor 200 in FIG. 2) may identify at least one file to be transmitted to another electronic device. According to an embodiment, when a messenger application program is executed, the processor 200 may control the display 220 to display a user interface (e.g., a graphical user interface (GUI)) related to the messenger application program. The processor 200 may select the at least one file to be transmitted to the other electronic device through the user interface related to the messenger application program displayed on the display 220. For example, the file may include a video file, an audio file, an image file, a text file and/or a compression file.

According to various embodiments, in operation 303, an electronic device (e.g., the processor 120 or 200) may transmit, to a content server, the at least one file to be transmitted to another electronic device. According to an embodiment, when the messenger application program is executed, the processor 200 may access the content server. For example, the processor 200 may perform an authentication procedure with the content server based on an authentication request from the content server. According to an embodiment, the processor 200 may control the communication circuitry 210 to transmit, to the content server, at least one file to be transmitted to another electronic device (e.g., the electronic device 102 or 104 in FIG. 1). For example, the processor 200 may control the communication circuitry 210 to transmit, to the content server, at least one file and thumbnail information related to the at least one file. For example, if multiple files are selected, the processor 200 may control the communication circuitry 210 to sequentially transmit the files to the content server. For example, if a compression transfer is used, the processor 200 may control the communication circuitry 210 to transmit, to the content server, a single compression file generated by compressing at least one file.

According to various embodiments, in operation 305, an electronic device (e.g., the processor 120 or 200) may receive, from the content server, a message body related to the at least one file. For example, the message body may include at least one of an address (e.g., a URL) related to a file (or a thumbnail), the size of a file (or a thumbnail) or the type of file (or thumbnail).

According to various embodiments, in operation 307, an electronic device (e.g., the processor 120 or 200) may add, to the message body, information related to a file function. For example, the file function may include a file transfer function for transmitting at least one file to another electronic device by using an IMS-based message and/or a file control function for controlling the configuration of a file. For example, the file transfer function may include a bundle transfer function and/or a compression transfer function. For example, the file control function may include a deadline setting up function, a copy restriction function and/or a deletion restriction function. For example, the IMS-based message is a message standardized in order to provide communication services based on the IMS, and may include an RCS message.

According to an embodiment, the processor 200 may add, to a name space of the message body, the information related to the at least one file function as in Table 1 below.

TABLE 1

```
To: <sip:anonymous@anonymous.invalid>
DateTime: [yyyy-mm-dd]T[hh:mm:ss.xxx]Z
NS: imdn <urn:ietf:params:imdn>
imdn.Message-ID: [imdn.Message-ID]
imdn.Disposition-Notification: positive-delivery, display
NS: [prefix] <[GSMA or other committees URL]>
[prefix].[Feature name]: [Feature value]
Content-type: [Content-type]
Content-Length: [Content-Length]
```

For example, [prefix] <[GSMA or other committees URL]> may indicate the URL of an organization related to a prefix of a name space. Feature name may indicate a delimiter (e.g., a name) for delimiting a file function. Feature value may include identification information for processing the file function.

According to an embodiment, the processor 200 may add, to a file information tag (file-info tag) of a message body, information related to at least one file function as in Table 2 below.

TABLE 2

```
<?xml version="1.0" encoding="UTF-8"?>
<file xmlns="urn:gsma:params:xml:ns:rcs:rcs:fthttp"
  xmlns:x="urn:gsma:params:xml:ns:res:res:up:fthttpext">
  <file-info type="thumbnail">
    <file-size>[thumbnail size in bytes]</file-size>
    <content-type>[MIME-type for thumbnail]</content-type>
    <data url = "[HTTP URL for the thumbnail]" until = "[validity of the thumbnail]"/>
  </file-info>
  <file-info type="file" file-feature="[file-feature]" >
    <file-size>[file size in bytes]</file-size>
    <file-name>[original file name]</file-name>
    <content-type>[MIME-type for file]</content-type>
    <data url = "[HTTP URL for the file]" until = "[validity of the file]"/>
    <[featureTag1]>[feature1 value]</[featureTag1]>
    <[featureTag2]>[feature2 value]</[featureTag2]>
    ...
    <x:branded-url>[alternative branded HTTP URL of the file]</x:branded-url>
  </file-info>
</file>
```

For example, file-feature may indicate a file information tag added for the extension of a file function. [file-feature] may indicate a delimiter (e.g., a name) for delimiting the file function. [feature value] may include identification information for processing the file function.

According to an embodiment, the processor 200 may add, to a file tag of a message body, information related to at least one file function as in Table 3 below.

TABLE 3

```
<?xml version="1.0" encoding="UTF-8"?>
<file xmlns="urn:gsma:params:xml:ns:rcs:rcs:fthttp"
  xmlns:x="urn:gsma:params:xml:ns:rcs:rcs:up:fthttpext">
  <file-info type="thumbnail">
    <file-size>[thumbnail size in bytes]</file-size>
    <content-type>[MIME-type for thumbnail]</content-type>
    <data url = "[HTTP URL for the thumbnail]" until = "[validity of the thumbnail]"/>
  </file-info>
  <file-info type="file" file-feature="[file-feature]" >
    <file-size>[file size in bytes]</file-size>
    <file-name>[original file name]</file-name>
    <content-type>[MIME-type for file]</content-type>
    <data url = "[HTTP URL for the file]" until = "[validity of the file]"/>
    <x:branded-url>[alternative branded HTTP URL of the file]</x:branded-url>
  </file-info>
  <file-feature type = "[file-feature]">
    <[featureTag1]>[feature1 value]</[featureTag1]>
    <[featureTag2]>[feature2 value]</[featureTag2]>
    ...
  </file-feature>
</file>
```

For example, file-feature type may indicate a file information tag added for the extension of a file function. [file-feature] may indicate a delimiter (e.g., a name) for delimiting the file function. [feature value] may include identification information for processing the file function.

According to various embodiments, in operation 309, an electronic device (e.g., the processor 120 or 200) may transmit, to another electronic device, a message (e.g., a file transfer message) including information related to at least one file and at least one file function. According to an embodiment, the processor 200 may control the communication circuitry 210 to transmit, to another electronic device (e.g., the electronic device 102 or 104 in FIG. 1), a message (e.g., a file transfer message) generated by adding information related to at least one file function to a message body related to at least one file received from a content server. For example, the message may be transmitted to the other electronic device through a transmission server based on a message session relay protocol (MSRP) or a session initiation protocol (SIP). For example, the transmission server may include an IMS server and/or a messaging application server.

According to various embodiments, the electronic device 101 may transmit, to a separate RCS server, information related to the capability of the electronic device 101. According to an embodiment, when initially accessing a separate RCS server, the processor 200 may transmit, to the separate RCS server, information related to the capability of the electronic device 101. According to an embodiment, when the capability of the electronic device 101 is changed, the processor 200 may transmit, to the separate RCS server, information related to the capability of the electronic device 101. For example, the capability of the electronic device 101 may be transmitted in a table form (e.g., table 9 in RCC.07: Complete SIP OPTIONS tag and Presence Service ID usage for RCS), such as Table 4 (e.g., RCC.07 standard) below.

TABLE 4

| Archive file transfer | Tag | =+g.3gpp.iari-ref="urn%3Aurn-7%3A3gppapplication.ims.iari.rcs.archiveft" |
|---|---|---|
| | Service ID | Service-id: org.3gpp.urn:urn-7:3gpp-application.ims.iari.rcs.archiveft |
| | | Version: 1.0 |
| | | Contact address type: tel / SIP URI |

TABLE 4-continued

| | | |
|---|---|---|
| Timer file transfer | Tag | =+g.3gpp.iari-ref="urn%3Aurn-7%3A3gppapplication.ims.iari.rcs.timerft" |
| | Service ID | Service-id: org.3gpp.urn:urn-7:3gpp-application.ims.iari.rcs.timerft<br>Version: 1.0<br>Contact address type: tel / SIP URI |
| Restrict file transfer | Tag | =+g.3gpp.iari-ref="urn%3Aurn-7%3A3gppapplication.ims.iari.rcs.restrictft" |
| | Service ID | Service-id: org.3gpp.urn:urn-7:3gpp-application.ims.iari.rcs.restrictft<br>Version: 1.0<br>Contact address type: tel / SIP URI |

For example, "Archive file transfer" may include information related to a compression transfer. "Timer file transfer" may include information related to deadline setting. "Restrict file transfer" may include information related to a copy restriction.

Figure 4:
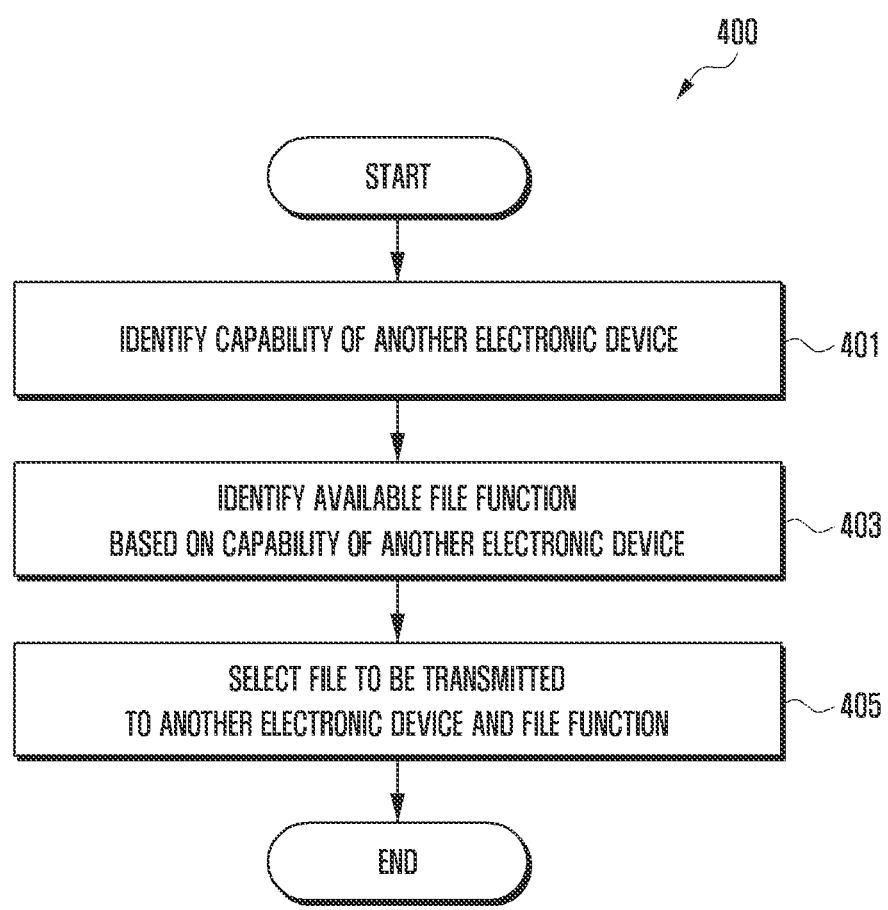
FIG. 4 is an example of a flowchart for identifying a file function available in an electronic device according to an embodiment of the disclosure.

FIG. 4 is an example of a flowchart for identifying a file function available in an electronic device according to an embodiment of the disclosure.

According to an embodiment, operations in flowchart 400 of FIG. 4 may be detailed operations of operation 301 in FIG. 3. In the following embodiments, the operations may be sequentially performed, but are not essentially sequentially performed. For example, the order of the operations may be changed, and at least two of the operations may be performed in parallel. For example, the electronic device in FIG. 4 may be a transmission device that transmits a message, and may be the electronic device 101 in FIG. 1 or 2. For example, at least some of FIG. 4 may be described with reference to FIG. 5.

Figure 5:
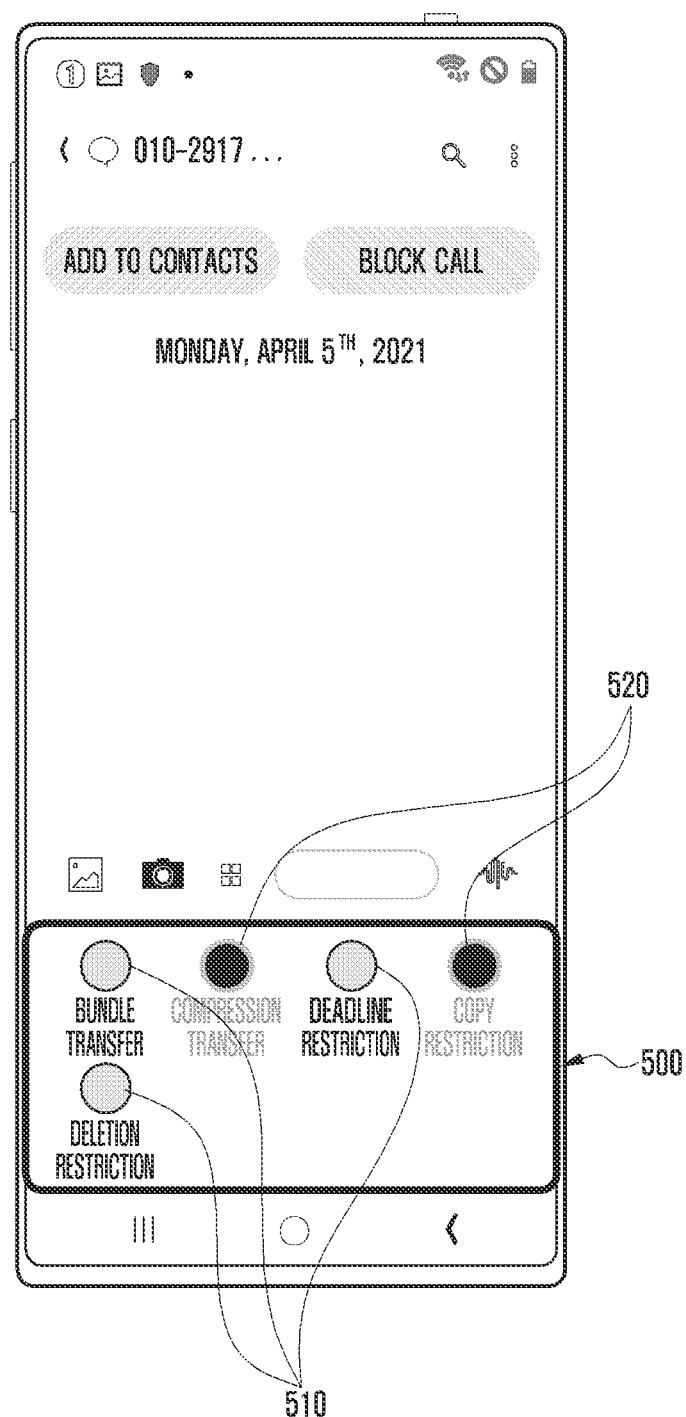
FIG. 5 is an example of a screen constitution for displaying a file function available in an electronic device according to an embodiment of the disclosure.

FIG. 5 is an example of a screen constitution for displaying a file function available in an electronic device according to an embodiment of the disclosure.

Referring to FIG. 4, in operation 401, an electronic device (e.g., the processor 120 in FIG. 1 or the processor 200 in FIG. 2) may identify the capability of another electronic device to which at least one file will be transmitted. According to an embodiment, the processor 200 may obtain identification information of another electronic device from a separate RCS server. For example, the processor 200 may obtain identification information of another electronic device to which a message will be transmitted based on the generation of an event related to a message (or a file) transfer. The processor 200 may control the communication circuitry 210 to transmit, to the separate RCS server, a request message related to the capability of the other electronic device based on the identification information of the other electronic device. The processor 200 may receive the identification information of the other electronic device from the separate RCS server as a response to the request message. For example, the separate RCS server may include an RCS application server or a presence server. For example, the event related to the message (or a file) transfer may be generated based on the execution of a message application program.

According to various embodiments, in operation 403, an electronic device (e.g., the processor 120 or 200) may identify at least one file function available for a file transfer to another electronic device among multiple file functions based on the capability of the other electronic device. According to an embodiment, the processor 200 may select at least one file function identified as being supported by another electronic device, among multiple file functions, based on the capability of the other electronic device.

According to an embodiment, the processor 200 may control the display 220 so that at least one file function available for a file transfer to another electronic device among multiple file functions is displayed as being distinct from the remaining file functions. For example, when obtaining an input for selecting a file function as in FIG. 5, the processor 200 may control the display 220 to display a file function list 500 supportable by the electronic device 101 in at least a part of a user interface of a messenger application program. For example, the file function list 500 may discriminatively display at least one file function 510 available for a file transfer to another electronic device and at least another file function 520 whose use for a file transfer to another electronic device is restricted. For example, the at least one file function 510 (e.g., a bundle transfer, a deadline and/or a deletion restriction) available for a file transfer to another electronic device may be displayed as an activation state. For example, the at least another file function 520 (e.g., a compression transfer and/or a copy restriction) whose use for a file transfer to another electronic device is restricted may be displayed as a deactivation state.

According to various embodiments, in operation 405, an electronic device (e.g., the processor 120 or 200) may select at least one file to be transmitted to another electronic device and at least one file function related to the at least one file. For example, the at least one file to be transmitted to the other electronic device may include at least one file selected based on input information obtained through an input device (not illustrated) of the electronic device 101 among multiple files stored in the memory 230. For example, the at least one file function related to the at least one file to be transmitted to the other electronic device may include at least one file function selected based on input information obtained through an input device (not illustrated) of the electronic device 101 among one or more file functions available for a file transfer to the other electronic device.

According to various embodiments, the electronic device 101 may display a file function list including at least one file function supported by another electronic device so that a user of the electronic device 101 may select the file function related to at least one file to be transmitted to the other electronic device. According to an embodiment, the processor 200 may identify at least one file function which is available to transmit at least one file to another electronic device based on information related to the capability of another electronic device to which a message (or a file) will be transmitted among multiple file functions supported by the electronic device 101. The processor 200 may control the display 220 to display, in at least a part of a user interface of a messenger application program, a file function list including at least one file function which is available to transmit at least one file to another electronic device.

Figure 6:
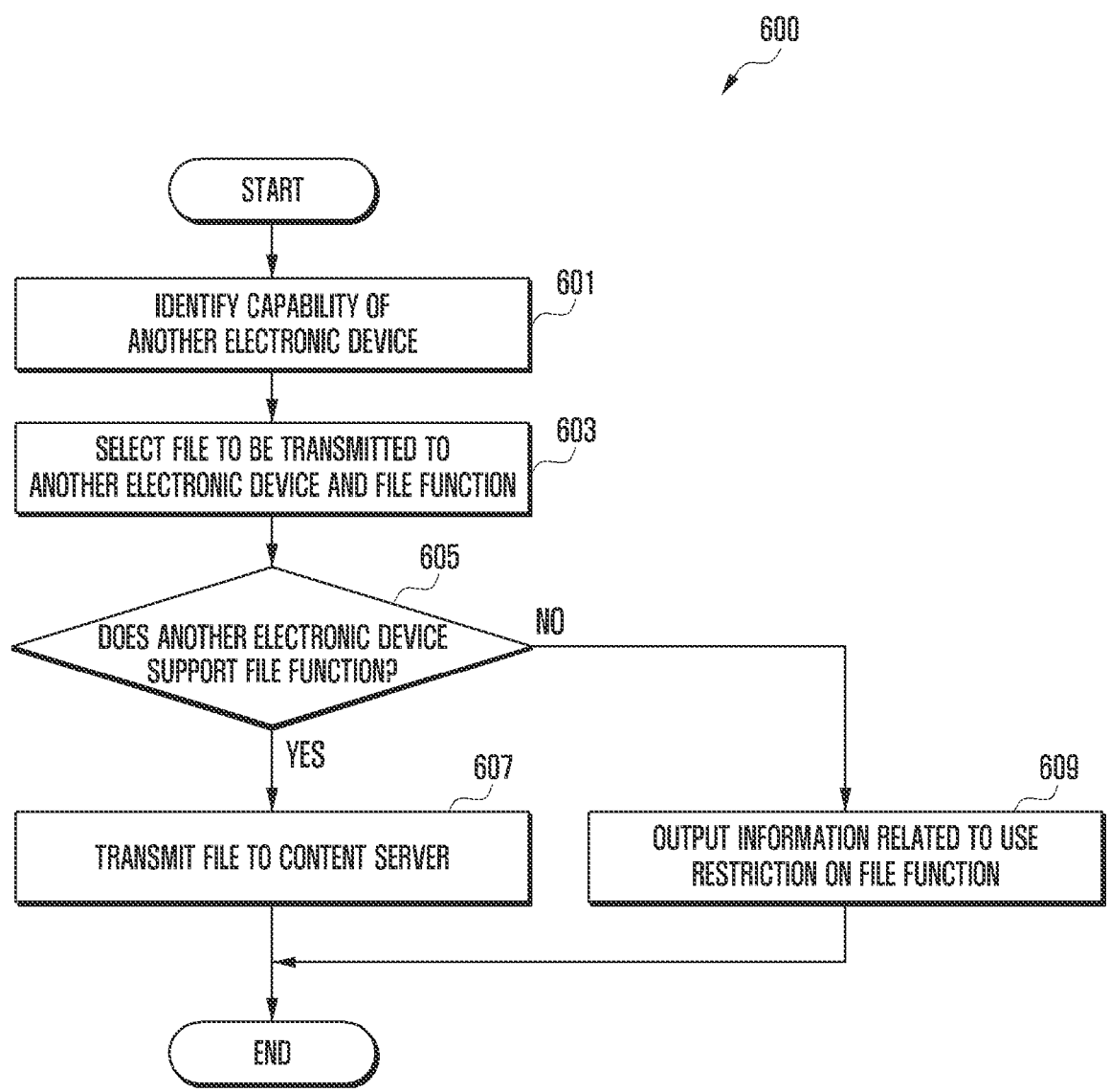
FIG. 6 is another example of a flowchart for identifying a file function available in an electronic device according to an embodiment of the disclosure.

FIG. 6 is another example of a flowchart for identifying a file function available in an electronic device according to an embodiment of the disclosure.

According to an embodiment, operations in flowchart 600 of FIG. 6 may be detailed operations of operation 301 and operation 303 in FIG. 3. In the following embodiments, the operations may be sequentially performed, but are not essentially sequentially performed. For example, the order of the operations may be changed, and at least two of the operations may be performed in parallel. For example, the electronic device in FIG. 6 is a transmission device that transmits a message, and may be the electronic device 101 in FIG. 1 or 2. For example, at least some of FIG. 6 may be described with reference to FIG. 7.

Figure 7:
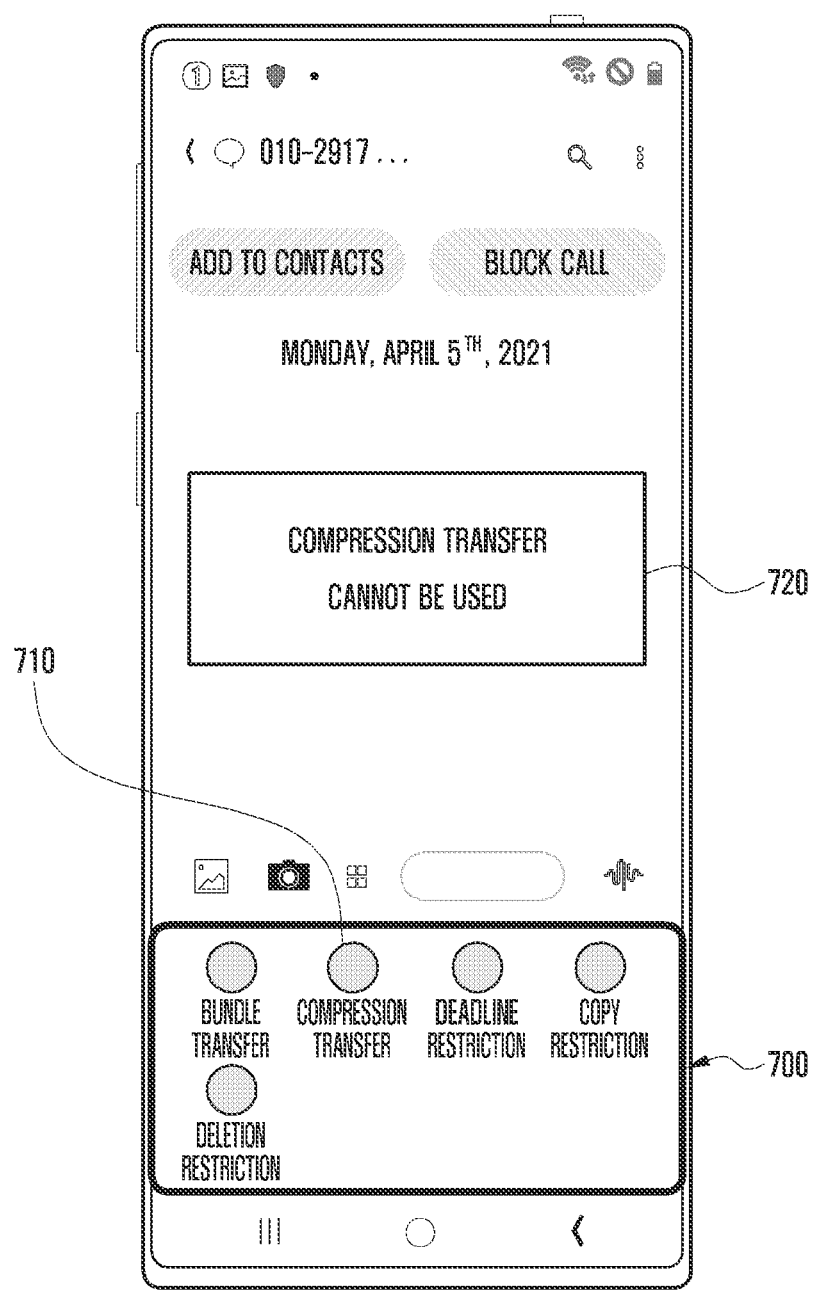
FIG. 7 is an example of a screen constitution for displaying whether a file function is available in an electronic device according to an embodiment of the disclosure.

FIG. 7 is an example of a screen constitution for displaying whether a file function is available in an electronic device according to an embodiment of the disclosure.

Referring to FIG. 6, in operation 601, an electronic device (e.g., the processor 120 in FIG. 1 or the processor 200 in FIG. 2) may identify the capability of another electronic device to which at least one file will be transmitted. According to an embodiment, the processor 200 may obtain, from a separate RCS server, information related to the capability of another electronic device. For example, the separate RCS server may include an RCS application server or a presence server.

According to various embodiments, in operation 603, an electronic device (e.g., the processor 120 or 200) may select at least one file to be transmitted to another electronic device and at least one file function related to the at least one file. According to an embodiment, when obtaining an input for selecting a file function as in FIG. 7, the processor 200 may control the display 220 to display, in at least a part of a user interface of a messenger application program, a file function list 700 supportable by the electronic device 101. The processor 200 may select at least one file function (e.g., a compression transfer 710) related to at least one file to be transmitted to another electronic device in the file function list 700 displayed on the display 220 based on input information obtained through an input device (not illustrated) of the electronic device 101. According to an embodiment, the at least one file to be transmitted to the other electronic device may include at least one file selected based on input information obtained through an input device (not illustrated) of the electronic device 101 among multiple files stored in the memory 230.

According to various embodiments, in operation 605, an electronic device (e.g., the processor 120 or 200) may identify whether the other electronic device supports the at least one file function related to the at least one file to be transmitted to the other electronic device. According to an embodiment, when selecting the compression transfer 710 related to the at least one file to be transmitted to the other electronic device as in FIG. 7, the processor 200 may identify whether the other electronic device supports the compression transfer based on the capability of the other electronic device.

According to various embodiments, when another electronic device supports at least one file function related to at least one file to be transmitted to another electronic device (e.g., "Yes" in operation 605), in operation 607, an electronic device (e.g., the processor 120 or 200) may transmit, to a content server, the at least one file to be transmitted to the other electronic device. According to an embodiment, the processor 200 may control the communication circuitry 210 to transmit, to the content server, the at least one file and/or thumbnail information related to the at least one file.

According to various embodiments, when another electronic device does not support at least one file function related to at least one file to be transmitted to another electronic device (e.g., "No" in operation 605), in operation 609, an electronic device (e.g., the processor 120 or 200) may output information related to use restriction on the file function. According to an embodiment, when identifying that the other electronic device does not support a compression transfer based on the capability of the other electronic device, the processor 200 may control the display 220 to display information 720 (e.g., "a compression transfer cannot be used") related to use restriction on the compression transfer as in FIG. 7.

According to various embodiments, when identifying that another electronic device does not support at least one file function related to at least one file to be transmitted to the other electronic device, the electronic device 101 may display the file function list 700 so that a user of the electronic device 101 may select another file function.

According to various embodiments, when identifying that another electronic device does not support at least one file function related to at least one file to be transmitted to the other electronic device, the electronic device 101 may select another file function related to the at least one file function. According to an embodiment, the processor 200 may select another file function related to at least one file function based on a use history of the file function and/or the similarity of the file function.

Figure 8:
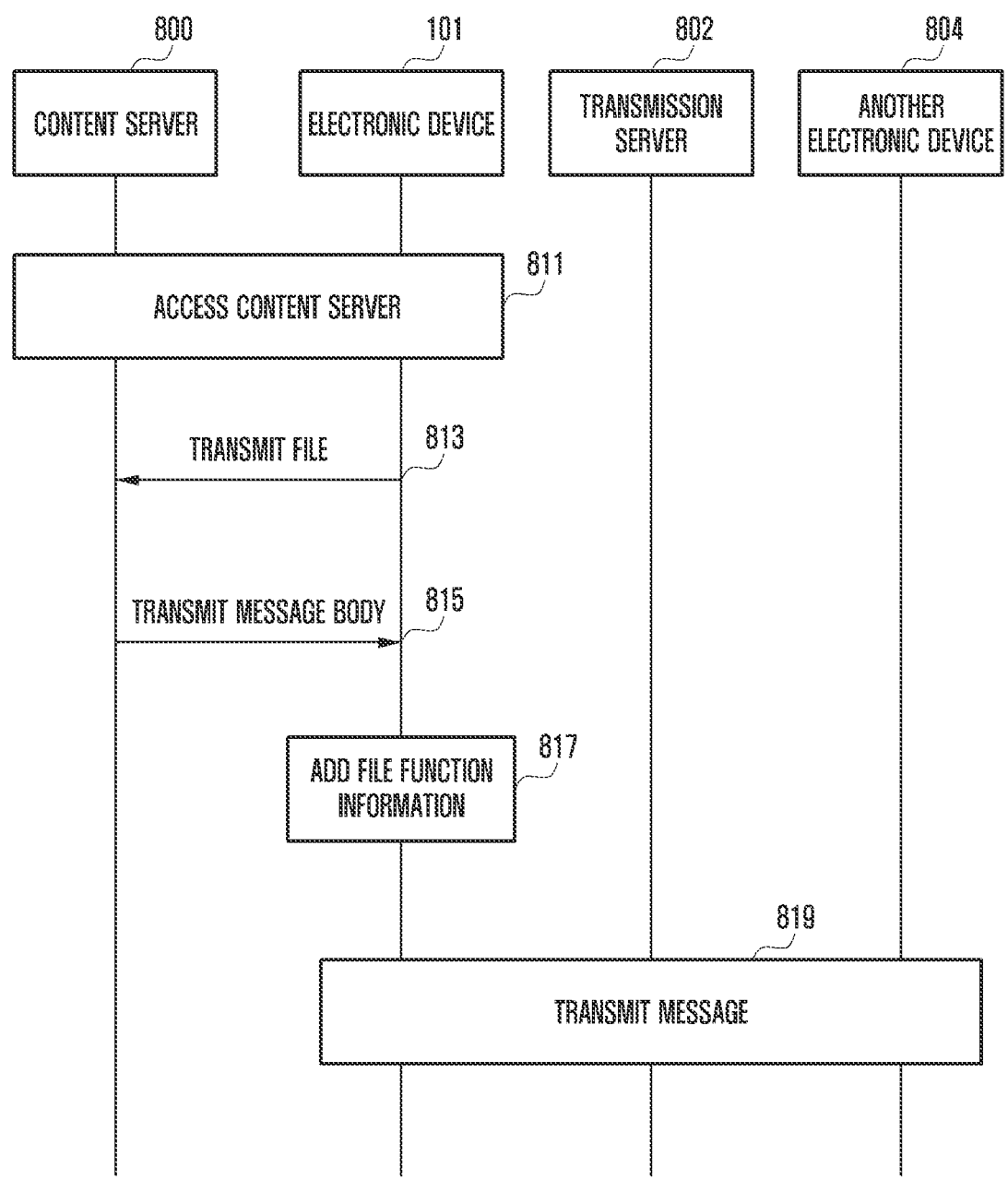
FIG. 8 is an example for transmitting a file in an electronic device according to an embodiment of the disclosure.

FIG. 8 is an example for transmitting a file in an electronic device according to an embodiment of the disclosure.

Referring to FIG. 8, an electronic device 101 may access a content server 800 (operation 811). According to an embodiment, when detecting the generation of an event related to a message (or a file) transfer, the electronic device 101 may transmit an access request message (e.g., an HTTP POST request) to the content server 800. According to an embodiment, when receiving an authentication request message (e.g., HTTP 401 AUTHENTICATION REQUIRED) as a response to the access request message, the electronic device 101 may perform an authentication procedure along with the content server 800. When succeeding in the authentication with the content server 800, the electronic device 101 may identify that the access to the content server 800 has been completed. According to an embodiment, when receiving a response message (e.g., HTTP 204 NO CONTENT) not requiring authentication as a response to the access request message, the electronic device 101 may identify that the access to the content server 800 has been completed. For example, the event related to the message (or a file) transfer may be generated based on the execution of a message application program. For example, the content server 800 may include an HTTP content server.

According to various embodiments, the electronic device 101 may transmit, to the content server 800, at least one file to be transmitted to another electronic device 804 (operation 813). According to an embodiment, the at least one file may be selected through a user interface related to a messenger application program displayed on the display 220. According to an embodiment, the electronic device 101 may transmit, to the content server 800, at least one file to be transmitted to the other electronic device 804 and/or thumbnail information related to the at least one file.

According to various embodiments, the content server 800 may generate a message body related to the at least one file received from the electronic device 101, and may transmit the message body to the electronic device 101 (operation 815). For example, the message body may include at least one of an address (e.g., a URL) related to a file (or a thumbnail), the size of a file (or a thumbnail) or the type of file (or thumbnail).

According to various embodiments, the electronic device 101 may add, to the message body received from the content server 800, information related to at least one file function (operation 817). According to an embodiment, the at least one file function may include at least one file function selected based on the capability of the other electronic device 804 among multiple file functions supported by the electronic device 101. For example, the capability of the other electronic device 804 may be obtained from the content server 800.

According to an embodiment, the electronic device 101 may add, to the message body received from the content server 800, information related to a bundle transfer. For example, the information related to the bundle transfer may be added to a name space of a message body as in Table 5 below.

TABLE 5

To: <sip:anonymous@anonymous.invalid>
DateTime: 2020-08-12T08:45:31.320Z
NS: imdn <urn:ietf:params:imdn>
imdn.Message-ID: 3a98e1b8-d0bb-4da5-a54f-91f3f210e391
imdn.Disposition-Notification: positive-delivery, display
NS: Korea-RCS <http://www.tta.or.kr>
Korea-RCS.FtHttpBundleInfo: amfk13713fasr1245(1/2)
Content-type: application/vnd.gsma.rcs-ft-http+xml;charset=UTF-8
Content-Length: 954

For example, Korea-RCS <http://www.tta.or.kr> may indicate the URL of an organization related to a prefix of a name space. FtHttpBundleInfo may indicate a delimiter (e.g., a name) for delimiting a bundle transfer amfk13713fasr1245 may indicate identification information for processing the bundle transfer. In (1/2), "1" may indicate the number of a current file transmitted through the bundle transfer, and "2" may indicate a total number of files transmitted through the bundle transfer.

For example, information related to the bundle transfer may be added to a file information tag (file-info tag) of a message body as in Table 6 below.

TABLE 6

```
<?xml version="1.0" encoding="UTF-8"?>
<file xmlns="urn:gsma:params:xml:ns:rcs:rcs:fthttp"
    xmlns:x="urn:gsma:params:xml:ns:rcs:rcs:up:fthttpext">
    <file-info type="thumbnail">
        <file-size>[thumbnail size in bytes]</file-size>
        <content-type>[MIME-type for thumbnail]</content-type>
        <data url = "[HTTP URL for the thumbnail]" until = "[validity of the
        thumbnail]"/>
    </file-info>
    <file-info type="file" file-feature="bundle" >
        <file-size>[file size in bytes]</file-size>
        <file-name>[original file name]</file-name>
        <content-type>[MIME-type for file]</content-type>
        <data url = "[HTTP URL for the file]" until = "[validity of the
        file]"/>
        <bm:bundle-id>[id]</bm:bundle-id>
        <bm:file-num>[file number]</bm:file-num>
        <bm:total-num>[total number]</bm:total-num>
        <x:branded-url>[alternative branded HTTP URL of the
        file]</x:branded-url>
    </file-info>
</file>
```

For example, file-feature="bundle" may indicate a delimiter (e.g., a name) for delimiting a bundle transfer in a file information tag added for a function extension. [id] may indicate identification information for processing the bundle transfer. file number may indicate the number of a current file transmitted through the bundle transfer. total number may indicate a total number of files transmitted through the bundle transfer.

For example, information related to the bundle transfer may be added to a file tag of a message body as in Table 7 below.

TABLE 7

```
<?xml version="1.0" encoding="UTF-8"?>
<file xmlns="urn:gsma:params:xml:ns:rcs:rcs:fthttp"
    xmlns:x="urn:gsma:params:xml:ns:rcs:rcs:up:fthttpext">
    <file-info type="thumbnail">
        <file-size>[thumbnail size in bytes]</file-size>
        <content-type>[MIME-type for thumbnail]</content-type>
        <data url = "[HTTP URL for the thumbnail]" until = "[validity of the
        thumbnail]"/>
    </file-info>
    <file-info type="file" file-feature="[file-feature]" >
        <file-size>[file size in bytes]</file-size>
        <file-name>[original file name]</file-name>
        <content-type>[MIME-type for file]</content-type>
        <data url = "[HTTP URL for the file]" until = "[validity of the
        file]"/>
        <x:branded-url>[alternative branded HTTP URL of the
        file]</x:branded-url>
    </file-info>
    <file-feature type = "bundle">
        <id>[id]</id>
        <file-num>[file number]</file-num>
        <total-num>[total number]</total-num>
    </file-feature>
</file>
```

For example, <file-feature type="bundle"> may indicate a delimiter (e.g., a name) for delimiting a bundle transfer in a file tag added for a function extension. [id] may indicate identification information for processing the bundle transfer. file number may indicate the number of a current file transmitted through the bundle transfer. total number may indicate a total number of files transmitted through the bundle transfer.

According to various embodiments, the electronic device 101 may transmit, to the other electronic device 804, a message (e.g., a file transfer message) including information related to the at least one file and the at least one file function through a transmission server 802 (operation 819). For example, the transmission server 802 may include an IMS server and/or a messaging application server.

According to various embodiments, the electronic device 101 may add a file function, such as a compression transfer, deadline setting (or a deadline restriction), a copy restriction or a deletion restriction, to the message body received from the content server 800. According to an embodiment, the electronic device 101 may add information related to a compression transfer to the message body received from the content server 800. For example, the information related to the compression transfer may be added to a name space of a message body as in Table 8 below.

TABLE 8

To: <sip:anonymous@anonymous.invalid>
DateTime: 2020-08-12T08:45:31.320Z
NS: imdn <urn:ietf:params:imdn>
imdn.Message-ID: 3a98e1b8-d0bb-4da5-a54f-91f3f210e391
imdn.Disposition-Notification: positive-delivery, display
NS: Korea-RCS <http://www.tta.or.kr>
Korea-RCS.FtHttpArchive: zip
Content-type: application/vnd.gsma.rcs-ft-http+xml;charset=UTF-8
Content-Length: 954

Content-type: application/vnd. gsma.rcs-ft-http+xml; charset=UTF-8
Content-Length: 954

For example, Korea-RCS <http://www.tta.or.kr> may indicate the URL of an organization related to the prefix of a name space. FtHttpArchive may indicate a delimiter (e.g., a name) for delimiting a compression transfer. zip may indicate a compressed file format.

For example, information related to the compression transfer may be added to a file information tag (file-info tag) of a message body as in Table 9 below.

TABLE 9

```
<?xml version="1.0" encoding="UTF-8"?>
<file xmlns="urn:gsma:params:xml:ns:rcs:rcs:fthttp"
   xmlns:x="urn:gsma:params:xml:ns:rcs:rcs:up:fthttpext">
   <file-info type="thumbnail">
      <file-size>[thumbnail size in bytes]</file-size>
      <content-type>[MIME-type for thumbnail]</content-type>
      <data url = "[HTTP URL for the thumbnail]" until = "[validity of the thumbnail]"/>
   </file-info>
   <file-info type="file" file-feature="archive" >
      <file-size>[file size in bytes]</file-size>
      <file-name>[original file name]</file-name>
      <content-type>[MIME-type for file]</content-type>
      <data url = "[HTTP URL for the file]" until = "[validity of the file]"/>
      <arm: archive-format>zip</arm:archive-format>
      <x:branded-url>[alternative branded HTTP URL of the file]</x:branded-url>
   </file-info>
</file>
```

For example, file-feature="archive" may indicate a delimiter (e.g., a name) for delimiting a compression transfer in a file information tag added for a function extension. zip may include a compressed file format.

For example, information related to the compression transfer may be added to a file tag of a message body as in Table 10 below.

TABLE 10

```
<?xml version="1.0" encoding="UTF-8"?>
<file xmlns="urn:gsma:params:xml:ns:rcs:rcs:fthttp"
   xmlns:x="urn:gsma:params:xml:ns:rcs:rcs:up:fthttpext">
   <file-info type="thumbnail">
      <file-size>[thumbnail size in bytes]</file-size>
      <content-type>[MIME-type for thumbnail]</content-type>
      <data url = "[HTTP URL for the thumbnail]" until = "[validity of the thumbnail]"/>
   </file-info>
   <file-info type="file" file-feature="[file-feature]" >
      <file-size>[file size in bytes]</file-size>
      <file-name>[original file name]</file-name>
      <content-type>[MIME-type for file]</content-type>
      <data url = "[HTTP URL for the file]" until = "[validity of the file]"/>
      <x:branded-url>[alternative branded HTTP URL of the file]</x:branded-url>
   </file-info>
   <file-feature type = "archive">
      <format>zip</format>
   </file-feature>
</file>
```

For example, <file-feature type="archive"> may indicate a delimiter (e.g., a name) for delimiting a compression transfer in a file tag added for a function extension. zip may include a compressed file format.

According to an embodiment, the electronic device 101 may add, to the message body received from the content server 800, information related to a deadline setting function (or a deadline restriction function). For example, information related to the deadline setting up function may be added to a name space of a message body as in Table 11 below.

TABLE 11

```
To: <sip:anonymous@anonymous.invalid>
DateTime: 2020-08-12T08:45:31.320Z
NS: imdn <urn:ietf:params:imdn>
imdn.Message-ID: 3a98e1b8-d0bb-4da5-a54f-91f3f210e391
imdn.Disposition-Notification: positive-delivery, display
NS: Korea-RCS <http://www.tta.or.kr>
Korea-RCS.FtHttpTimer: 3600
Content-type: application/vnd.gsma.rcs-ft-http+xml;charset=UTF-8
Content-Length: 954
```

For example, Korea-RCS <http://www.tta.or.kr> may indicate the URL of an organization related to the prefix of a name space. FtHttpTimer may indicate a delimiter (e.g., a name) for delimiting a deadline setting function (or a deadline restriction function). 3600 may indicate information related to the valid time of a message or a file included in the message based on the deadline setting up function.

For example, information related to the deadline setting up function may be added to a file information tag (file-info tag) of a message body as in Table 12 below.

TABLE 12

```
<?xml version="1.0" encoding="UTF-8"?>
<file xmlns="urn:gsma:params:xml:ns:rcs:rcs:fthttp"
   xmlns:x="urn:gsma:params:xml:ns:rcs:rcs:up:fthttpext">
   <file-info type="thumbnail">
      <file-size>[thumbnail size in bytes]</file-size>
      <content-type>[MIME-type for thumbnail]</content-type>
      <data url = "[HTTP URL for the thumbnail]" until = "[validity of the thumbnail]"/>
   </file-info>
   <file-info type="file" file-feature="timer" >
      <file-size>[file size in bytes]</file-size>
      <file-name>[original file name]</file-name>
      <content-type>[MIME-type for file]</content-type>
      <data url = "[HTTP URL for the file]" until = "[validity of the file]"/>
      <tm:time>3600</tm:time>
      <x:branded-url>[alternative branded HTTP URL of the file]</x:branded-url>
   </file-info>
</file>
```

For example, file-feature="timer" may indicate a delimiter (e.g., a name) for delimiting a deadline setting up function (or a deadline restriction function) in a file information tag added for a function extension. 3600 may indicate information related to the valid time of a message or a file included in the message based on the deadline setting up function. For example, information related to the deadline setting up function may be added to a file tag of a message body as in Table 13 below.

TABLE 13

```
<?xml version="1.0" encoding="UTF-8"?>
<file xmlns="urn:gsma:params:xml:ns:rcs:rcs:fthttp"
   xmlns:x="urn:gsma:params:xml:ns:rcs:rcs:up:fthttpext">
   <file-info type="thumbnail">
      <file-size>[thumbnail size in bytes]</file-size>
      <content-type>[MIME-type for thumbnail]</content-type>
      <data url = "[HTTP URL for the thumbnail]" until = "[validity of the thumbnail]"/>
   </file-info>
   <file-info type="file" file-feature="[file-feature]" >
      <file-size>[file size in bytes]</file-size>
      <file-name>[original file name]</file-name>
      <content-type>[MIME-type for file]</content-type>
      <data url = "[HTTP URL for the file]" until = "[validity of the file]"/>
      <x:branded-url>[alternative branded HTTP URL of the
```

TABLE 13-continued

```
    file]</x:branded-url>
  </file-info>
  <file-feature type = "timer">
    <time>3600</time>
  </file-feature>
</file>
```

For example, <file-feature type="timer"> may indicate a delimiter (e.g., a name) for delimiting a deadline setting up function (or a deadline restriction function) in a file tag added for a function extension. 3600 may indicate information related to the valid time of a message or a file included in the message based on the deadline setting up function.

According to an embodiment, the electronic device 101 may add, to the message body received from the content server 800, information related to a copy restriction function. For example, information related to the copy restriction function may be added to a name space of a message body as in Table 14 below.

TABLE 14

```
To: <sip:anonymous@anonymous.invalid>
DateTime: 2020-08-12T08:45:31.320Z
NS: imdn <urn:ietf:params:imdn>
imdn.Message-ID: 3a98e1b8-d0bb-4da5-a54f-91f3f210e391
imdn.Disposition-Notification: positive-delivery, display
NS: Korea-RCS <http://www.tta.or.kr>
Korea-RCS.FtHttpRestriction: copy
Content-type: application/vnd.gsma.rcs-ft-http+xml;charset=UTF-8
Content-Length: 954
```

For example, Korea-RCS <http://www.tta.or.kr> may indicate the URL of an organization related to the prefix of a name space. FtHttpRestriction may indicate a delimiter (e.g., a name) for delimiting a restriction function, and copy may indicate a kind of a restricted function.

For example, information related to the copy restriction function may be added to a file information tag (file-info tag) of a message body as in Table 15 below.

TABLE 15

```
<?xml version="1.0" encoding="UTF-8"?>
<file xmlns="urn:gsma:params:xml:ns:rcs:rcs:fthttp"
  xmlns:x="urn:gsma:params:xml:ns:rcs:rcs:up:fthttpext">
  <file-info type="thumbnail">
    <file-size>[thumbnail size in bytes]</file-size>
    <content-type>[MIME-type for thumbnail]</content-type>
    <data url = "[HTTP URL for the thumbnail]" until = "[validity of the
    thumbnail]"/>
  </file-info>
  <file-info type="file" file-feature="restriction" >
    <file-size>[file size in bytes]</file-size>
    <file-name>[original file name]</file-name>
    <content-type>[MIME-type for file]</content-type>
    <data url = "[HTTP URL for the file]" until = "[validity of the
    file]"/>
    <rm:function>copy</rm:function>
    <x:branded-url>[alternative branded HTTP URL of the
    file]</x:branded-url>
  </file-info>
</file>
```

For example, file-feature="restriction" may indicate a delimiter (e.g., a name) for delimiting a restriction function in a file information tag added for a function extension, and copy may indicate a kind of a restricted function.

For example, information related to the copy restriction function may be added to a file tag of a message body as in Table 16 below.

TABLE 16

```
<?xml version="1.0" encoding="UTF-8"?>
<file xmlns="urn:gsma:params:xml:ns:rcs:rcs:fthttp"
  xmlns:x="urn:gsma:params:xml:ns:rcs:rcs:up:fthttpext">
  <file-info type="thumbnail">
    <file-size>[thumbnail size in bytes]</file-size>
    <content-type>[MIME-type for thumbnail]</content-type>
    <data url = "[HTTP URL for the thumbnail]" until = "[validity of the
    thumbnail]"/>
  </file-info>
  <file-info type="file" file-feature="[file-feature]" >
    <file-size>[file size in bytes]</file-size>
    <file-name>[original file name]</file-name>
    <content-type>[MIME-type for file]</content-type>
    <data url = "[HTTP URL for the file]" until = "[validity of the
    file]"/>
    <x:branded-url>[alternative branded HTTP URL of the
    file]</x:branded-url>
  </file-info>
  <file-feature type = "restriction">
    <function>copy</function>
  </file-feature>
</file>
```

For example, <file-feature type="restriction"> may indicate a delimiter (e.g., a name) for delimiting a restriction function in a file tag added for a function extension, and copy may indicate a kind of a restricted function.

Figure 9:
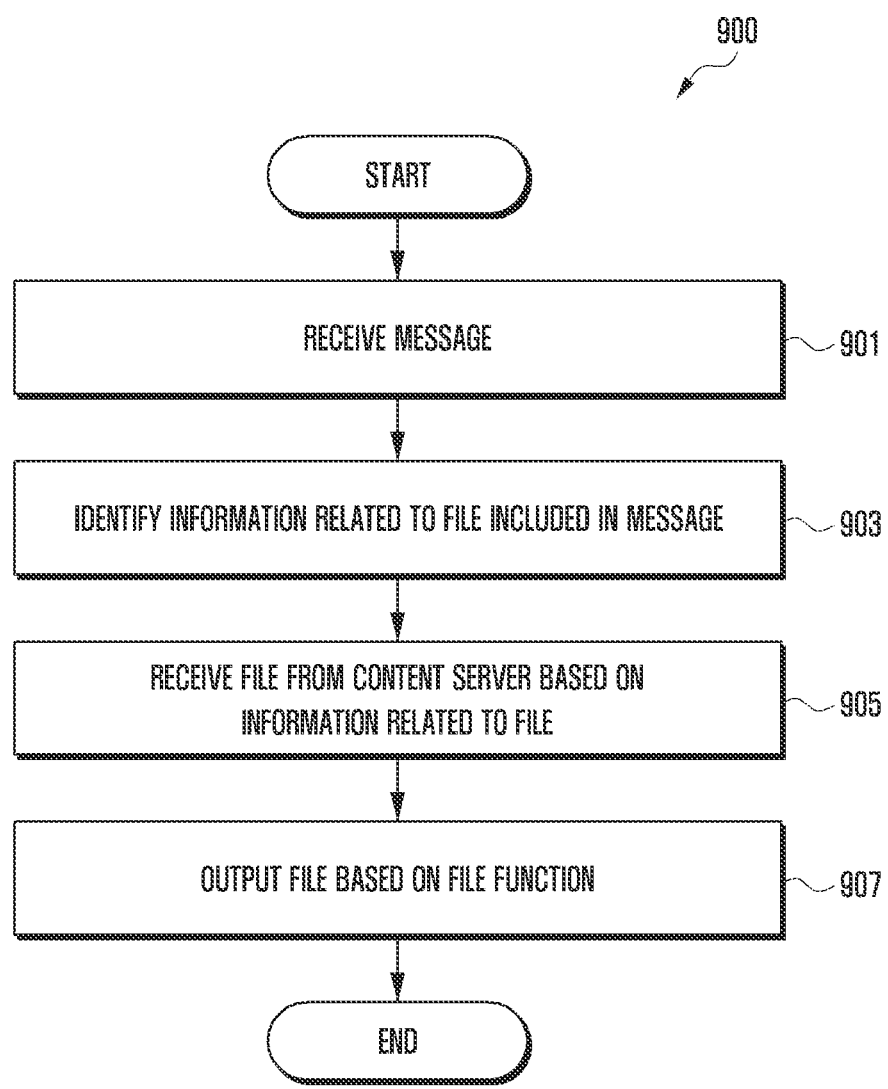
FIG. 9 is a flowchart for receiving a file in another electronic device according to an embodiment of the disclosure.

FIG. 9 is a flowchart for receiving a file in another electronic device according to an embodiment of the disclosure. In the following embodiments, operations may be sequentially performed, but are not essentially sequentially performed. For example, the order of the operations may be changed, and at least two of the operations may be performed in parallel. For example, the other electronic device in FIG. 9 may be a reception device that receives a message, and may be another electronic device 804 in FIG. 8.

Referring to FIG. 9 depicting flowchart 900, in operation 901, another electronic device may receive a message from an electronic device 101. According to an embodiment, another electronic device (e.g., the processor 120 or 200) may receive a message (e.g., a file transfer message) from the electronic device 101 through the transmission server 802 based on a message session relay protocol (MSRP) or a session initiation protocol (SIP). For example, the transmission server 802 may include an IMS server and/or a messaging application server.

According to various embodiments, in operation 903, the other electronic device may identify information related to a file included in the message. For example, the information related to the file may include at least one of an address (e.g., a URL) related to a file (or a thumbnail), the size of a file (or a thumbnail), the type of file (or thumbnail) or a file function related to a file.

According to various embodiments, in operation 905, the other electronic device may receive at least one file from a content server based on the information related to the file. According to an embodiment, when identifying the information related to the file included in the message, another electronic device (e.g., the processor 120 or 200) may transmit a file request message (e.g., HTTP GET request) to the content server 800. According to an embodiment, when receiving an authentication request message (e.g., HTTP 401 AUTHENTICATION REQUIRED) as a response to the file request message, another electronic device (e.g., the processor 120 or 200) may perform an authentication procedure with the content server 800. When succeeding in the authentication with the content server 800, another electronic device (e.g., the processor 120 or 200) may receive at least one file from the content server 800 based on an address (e.g., a URL) related to a file (or a thumbnail) detected in the message. According to an embodiment, when receiving a response message (e.g., HTTP 204 NO CONTENT) not requiring authentication as a response to the file request message, another electronic device (e.g., the processor 120 or 200) may receive at least one file from the content server 800 based on an address (e.g., a URL) related to a file (or a thumbnail) detected in the message. According to an embodiment, when receiving a compression file from the content server 800, another electronic device (e.g., the processor 120 or 200) may decompress the compression file.

According to various embodiments, in operation 907, the other electronic device may output the at least one file received from the content server based on a file function detected in the message. According to an embodiment, another electronic device (e.g., the processor 120 or 200) may display the at least one file in at least a part of a user interface related to a messenger application program, in a form corresponding to a file function.

According to various embodiments, when information related to a thumbnail and a file is included in a message received from the electronic device 101, the other electronic device 804 may sequentially receive the thumbnail and the file from the content server. According to an embodiment, another electronic device (e.g., the processor 120 or 200) may receive thumbnail information from the content server 800 based on information related to a thumbnail included in a message. According to an embodiment, when an auto-download configuration is activated, another electronic device (e.g., the processor 120 or 200) may automatically receive a file related to thumbnail information from the content server 800 after the reception of the thumbnail information is completed. For example, when receiving thumbnail information from the content server 800, another electronic device (e.g., the processor 120 or 200) may display the thumbnail information in at least a part of a user interface related to a messenger application program. When receiving a file related to thumbnail information, another electronic device (e.g., the processor 120 or 200) may change thumbnail information, displayed in at least a part of a user interface related to a messenger application program, into the file related to the thumbnail information.

According to an embodiment, when the auto-download configuration is deactivated, another electronic device (e.g., the processor 120 or 200) may display thumbnail information in at least a part of a user interface related to a messenger application program. When obtaining an input related to the download of a file, another electronic device (e.g., the processor 120 or 200) may receive a file related to thumbnail information from the content server 800.

Figure 10:
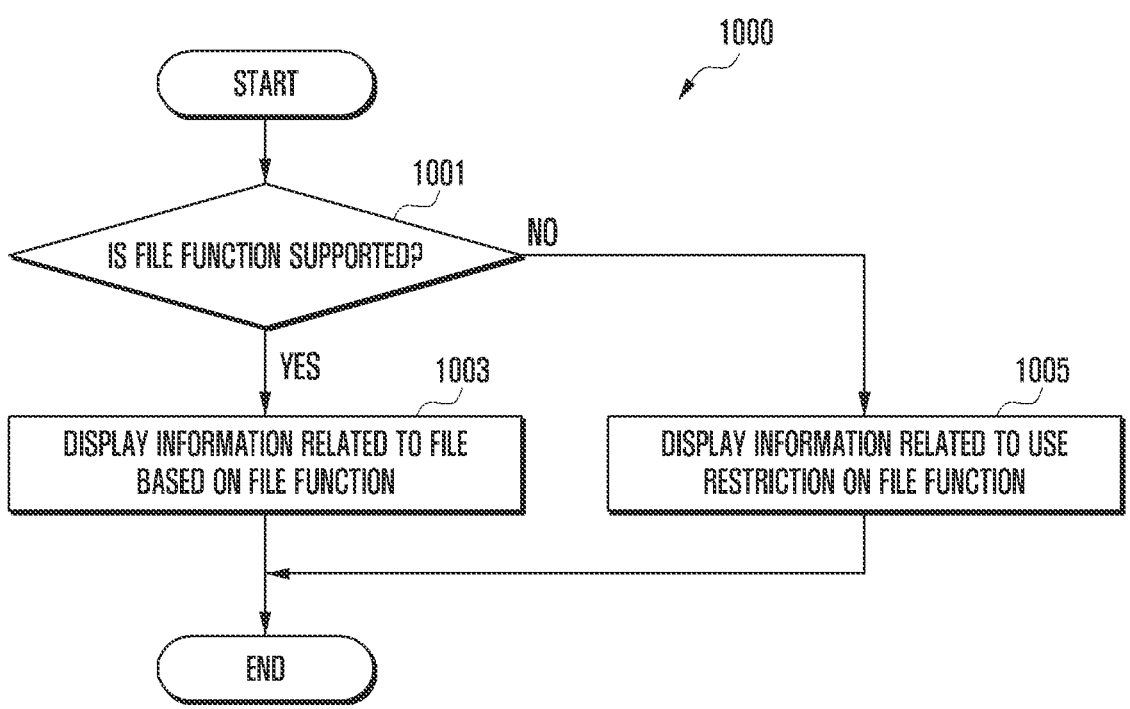
FIG. 10 is an example of a flowchart for displaying a file in another electronic device according to an embodiment of the disclosure.

FIG. 10 is an example of a flowchart for displaying a file in another electronic device according to an embodiment of the disclosure.

According to an embodiment, operations in flowchart 1000 of FIG. 10 may be detailed operations of operation 907 in FIG. 9. In the following embodiments, the operations may be sequentially performed, but are not essentially sequentially performed. For example, the order of the operations may be changed, and at least two of the operations may be performed in parallel. For example, the other electronic device in FIG. 10 may be a reception device that receives a message, and may be the other electronic device 804 in FIG. 8. For example, at least some of FIG. 10 may be described with reference to FIG. 11.

Figure 11:
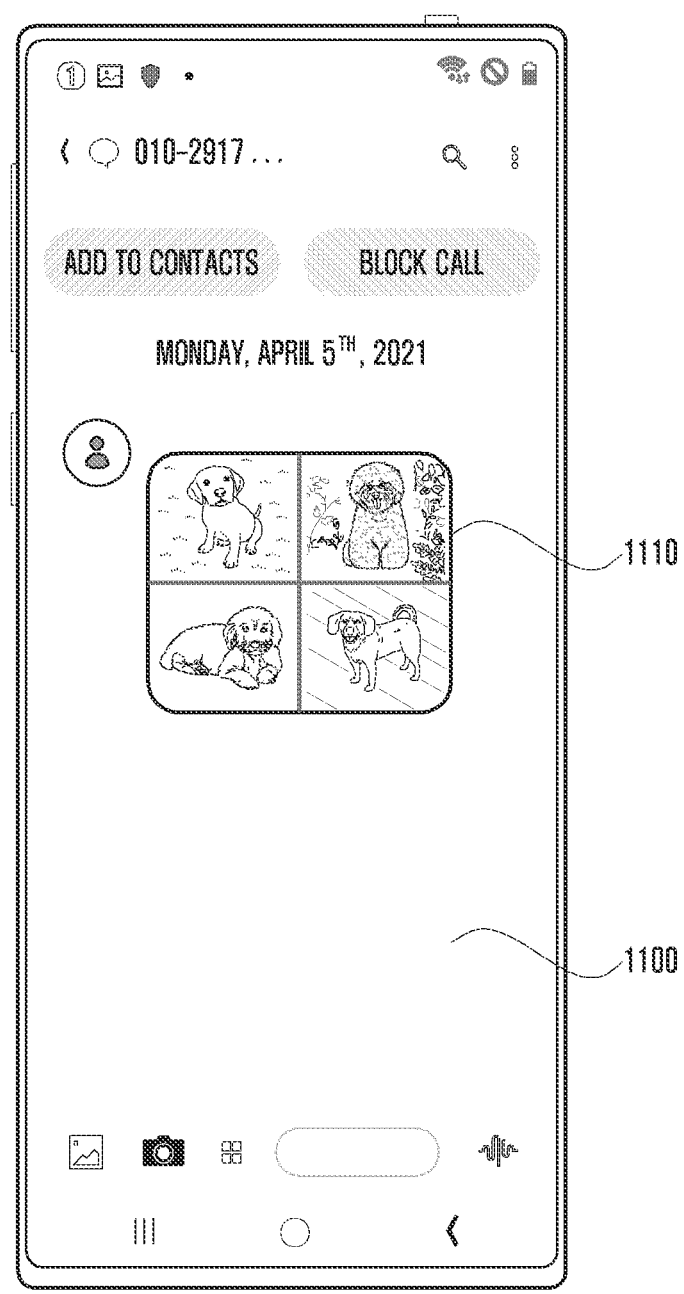
FIG. 11 is an example of a screen constitution for displaying a file related to a bundle transfer in another electronic device according to an embodiment of the disclosure.

FIG. 11 is an example of a screen constitution for displaying a file related to a bundle transfer in another electronic device according to an embodiment of the disclosure.

Referring to FIG. 10, in operation 1001, when receiving at least one file from a content server (e.g., operation 905 in FIG. 9), another electronic device may identify whether it supports a file function detected in a message received from the electronic device 101. According to an embodiment, when a bundle transfer function is configured in the electronic device 101, another electronic device (e.g., the processor 120 or 200) may identify whether it supports a bundle transfer based on the capability of the other electronic device 804.

According to various embodiments, when supporting the file function detected in the message received from the electronic device 101 (e.g., "Yes" in operation 1001), in operation 1003, the other electronic device may display information (e.g., received information) related to the at least one file based on the file function. According to an embodiment, as in FIG. 11, another electronic device (e.g., the processor 120 or 200) may display, in one bundle form 1110, at least one file (or thumbnail) in at least a part of a user interface 1100 related to a messenger application program based on a bundle function.

According to various embodiments, when not supporting the file function detected in the message received from the electronic device 101 (e.g., "No" in operation 1001), in operation 1005, another electronic device may output information related to use restriction on the file function. According to an embodiment, when not supporting a bundle function, another electronic device (e.g., the processor 120 or 200) may display information related to use restriction on the bundle transfer. Information related to use restriction on the bundle transfer may be displayed in at least a part of the user interface 1100 related to the messenger application program.

According to various embodiments, when not supporting a file function detected in a message received from the electronic device 101, another electronic device may display at least one file based on another file function. According to an embodiment, when not supporting a file function detected in a message received from the electronic device 101, another electronic device (e.g., the processor 120 or 200) may select another file function related to the file function detected in the message based on a use history of the file function and/or the similarity of the file function. Another electronic device (e.g., the processor 120 or 200) may display information related to at least one file based on the other file function. For example, when not supporting a bundle transfer, another electronic device (e.g., the processor 120 or 200) may sequentially display information (e.g., received information) related to each file based on a common transfer function related to the bundle transfer.

Figure 12:
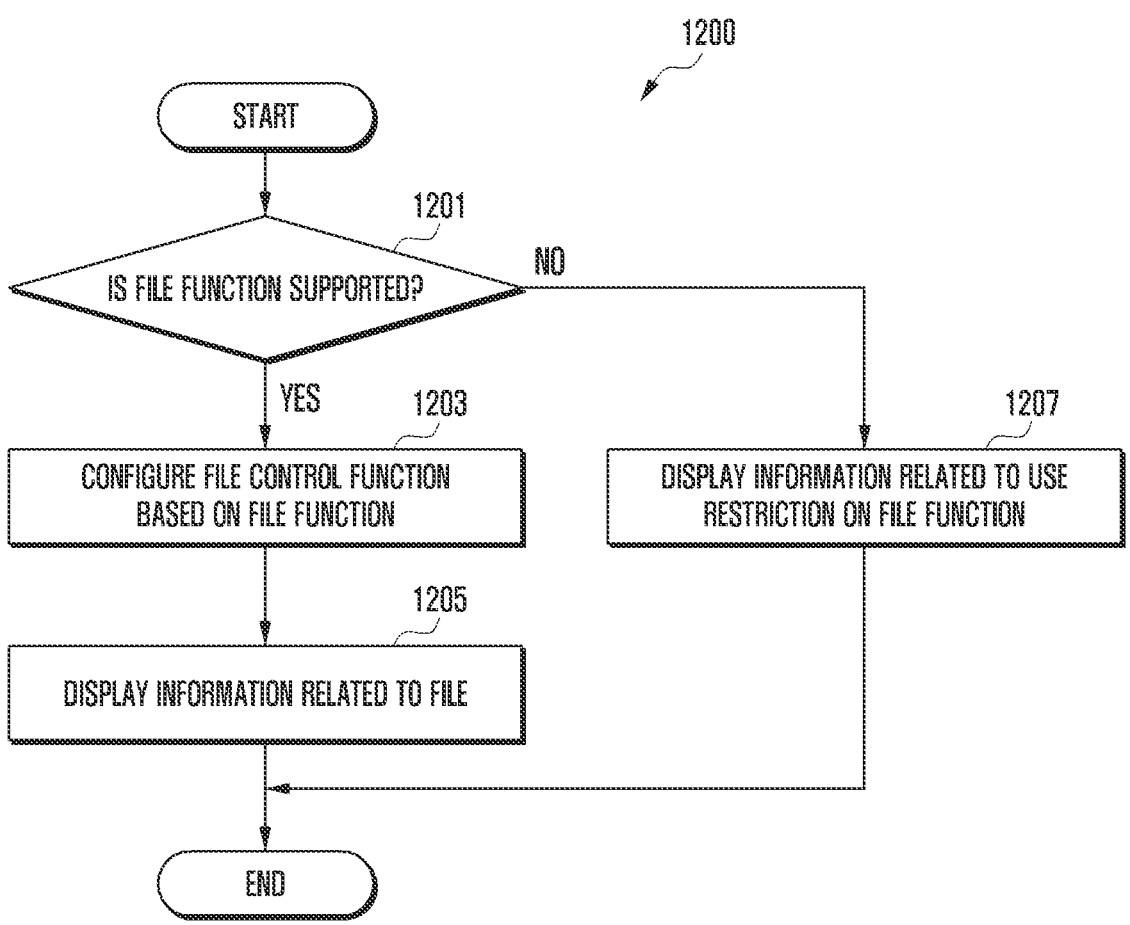
FIG. 12 is an example of a flowchart for configuring a file control function in another electronic device according to an embodiment of the disclosure.

FIG. 12 is an example of a flowchart for configuring a file control function in another electronic device according to an embodiment of the disclosure.

According to an embodiment, operations in flowchart 1200 of FIG. 12 may be detailed operations of operation 907 in FIG. 9. In the following embodiments, the operations may be sequentially performed, but are not essentially sequentially performed. For example, the order of the operations may be changed, and at least two of the operations may be performed in parallel. For example, another electronic device in FIG. 12 may be a reception device that receives a message, and may be the other electronic device 804 in FIG. 8. For example, at least some of FIG. 12 may be described with reference to FIGS. 13A, 13B, 14, and 15.

Figure 13A:
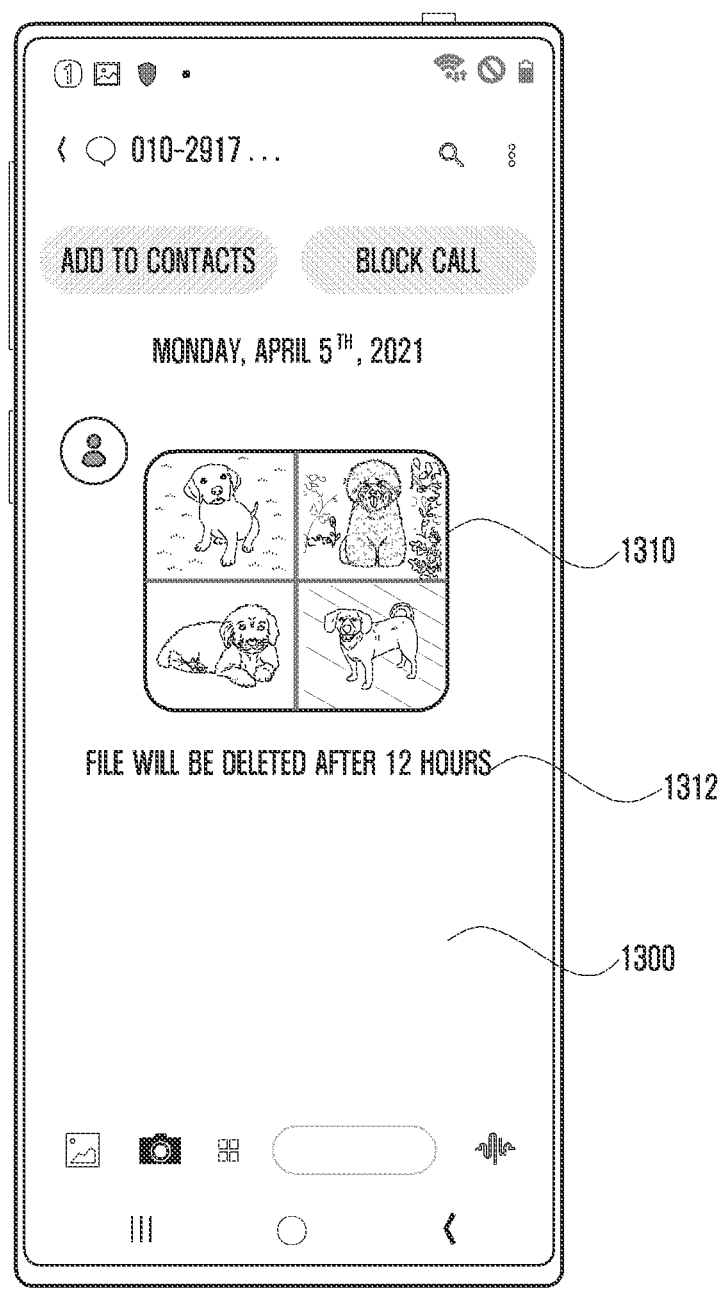
FIGS. 13A and 13B are examples of a screen constitution for displaying a file for which a file use restriction function has been configured in another electronic device according to various embodiments of the disclosure.
Figure 13B:
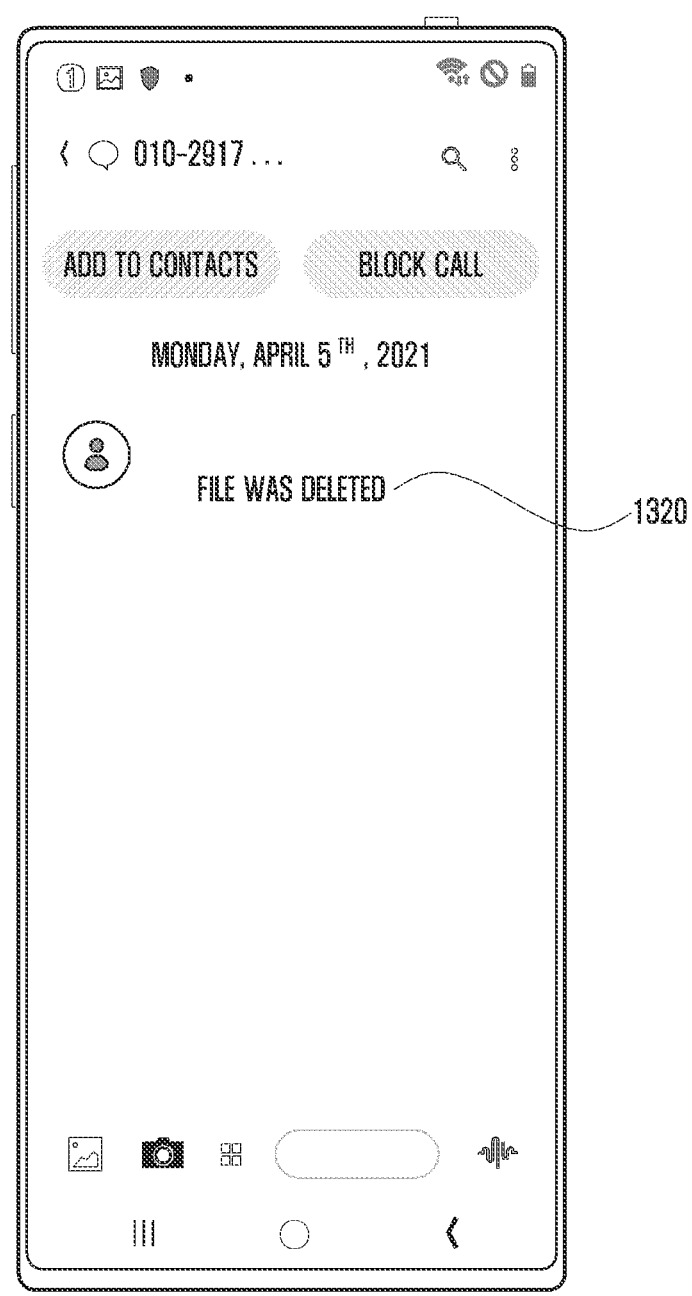

FIGS. 13A and 13B are examples of a screen constitution for displaying a file for which a file use restriction function has been configured in another electronic device according to various embodiments of the disclosure.

Figure 14:
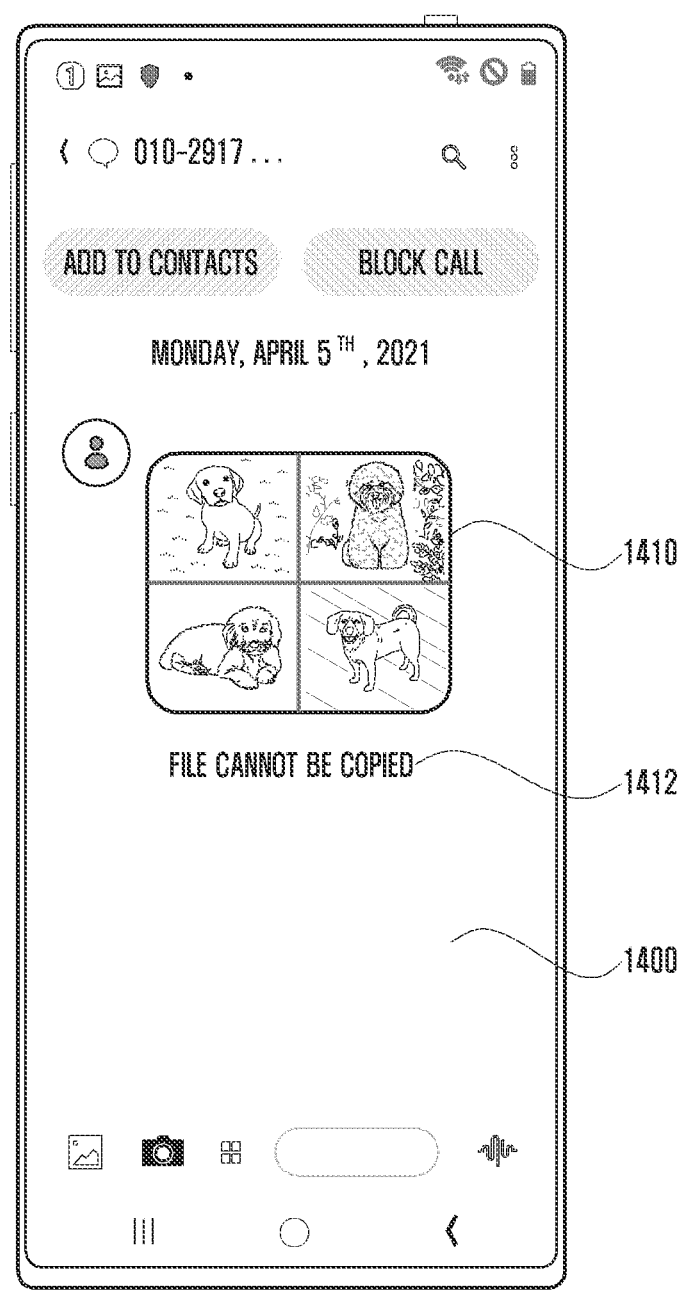
FIG. 14 is an example of a screen constitution for displaying a file for which a copy restriction function has been configured in another electronic device according to an embodiment of the disclosure.

FIG. 14 is an example of a screen constitution for displaying a file for which a copy restriction function has been configured in another electronic device according to an embodiment of the disclosure.

Figure 15:
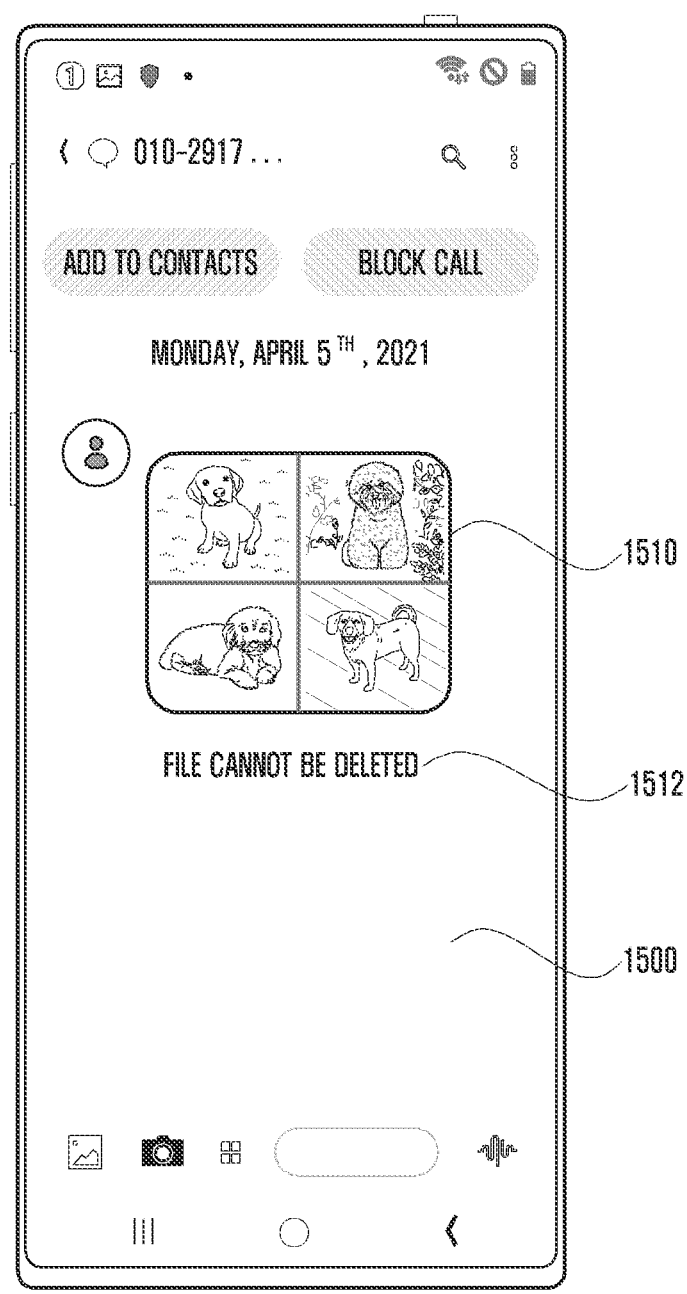
FIG. 15 is an example of a screen configuration for displaying a file for which a deletion restriction function has been configured in another electronic device according to an embodiment of the disclosure.

FIG. 15 is an example of a screen configuration for displaying a file for which a deletion restriction function has been configured in another electronic device according to an embodiment of the disclosure.

Referring to FIG. 12, when receiving at least one file from a content server (e.g., operation 905 in FIG. 9), in operation 1201, another electronic device may identify whether it supports a file function detected in a message received from the electronic device 101. According to an embodiment, another electronic device (e.g., the processor 120 or 200) may identify whether it supports the file function included in the message received from the electronic device 101 based on the capability of the other electronic device 804.

According to various embodiments, when supporting the file function detected in the message received from the electronic device 101 (e.g., "Yes" in operation 1201), in operation 1203, the other electronic device may configure a file control function related to the at least one file based on the file function. According to an embodiment, when detecting information related to a deadline setting up function (or a deadline restriction function) in a message received from the electronic device 101, another electronic device (e.g., the processor 120 or 200) may set a valid time of at least one file received from a content server. For example, the valid time may be detected in information related to the deadline setting up function (or the deadline restriction function) in the message received from the electronic device 101. According to an embodiment, when detecting information related to a copy restriction function in a message received from the electronic device 101, another electronic device (e.g., the processor 120 or 200) may configure a copy restriction function for at least one file received from a content server. According to an embodiment, when detecting information related to a deletion restriction function in a message received from the electronic device 101, another electronic device (e.g., the processor 120 or 200) may configure the deletion restriction function for at least one file received from a content server.

According to various embodiments, in operation 1205, the other electronic device may display information (e.g., received information) related to the at least one file for which the file control function has been configured. According to an embodiment, as in FIG. 13A, another electronic device (e.g., the processor 120 or 200) may display at least one file (or thumbnail) in at least a part of a user interface 1300 related to a messenger application program. For example, the at least one file may be displayed in a bundle form 1310. For example, information 1312 related to a valid time set based on a deadline setting up function may be displayed in at least a part of the user interface 1300 related to the messenger application program along with at least one file displayed in bundle form 1310. For example, when the valid time of the at least one file expires, as in FIG. 13B, another electronic device (e.g., the processor 120 or 200) may display information 1320 related to the deletion of the at least one file (or thumbnail) attributable to the expiration of the valid time.

According to an embodiment, as in FIG. 14, another electronic device (e.g., the processor 120 or 200) may display at least one file (or thumbnail) in at least a part of a user interface 1400 related to a messenger application program. For example, the at least one file may be displayed in a bundle form 1410. For example, copy restriction information 1412 for the at least one file may be displayed in at least a part of the user interface 1400 related to the messenger application program along with at least one file displayed in bundle form 1410 based on a copy configuration function.

According to an embodiment, as in FIG. 15, another electronic device (e.g., the processor 120 or 200) may display at least one file (or thumbnail) in at least a part of a user interface 1500 related to a messenger application program. For example, the at least one file may be displayed in a bundle form 1510. For example, deletion restriction information 1512 for the at least one file may be displayed in at least a part of the user interface 1500 related to the messenger application program along with at least one file displayed in bundle form 1510 based on a deletion configuration function.

According to various embodiments, when not supporting the file function detected in the message received from the electronic device 101 (e.g., "No" in operation 1201), in operation 1207, the other electronic device may output information related to use restriction on the file function.

Figure 16:
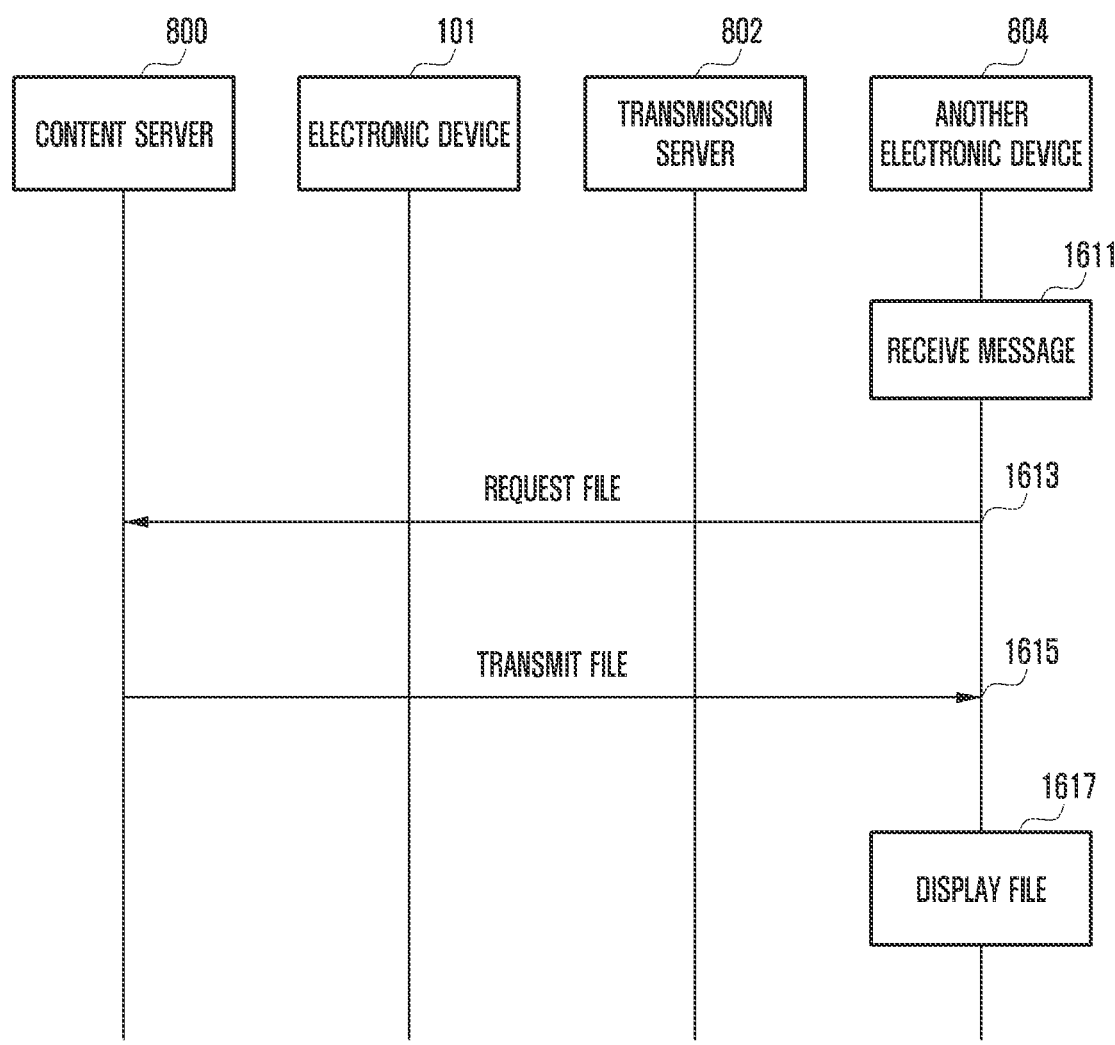
FIG. 16 is an example for receiving a file from an electronic device in another electronic device according to an embodiment of the disclosure.

FIG. 16 is an example for receiving a file from an electronic device in another electronic device according to an embodiment of the disclosure.

Referring to FIG. 16, another electronic device 804 may receive a message from an electronic device 101 through a transmission server 802 (operation 1611). For example, the transmission server 802 may include an IMS server and/or a messaging application server.

According to various embodiments, the other electronic device 804 may transmit, to the content server 800, a request message related to at least one file based on information related to the file included in the message (operation 1613). According to an embodiment, the other electronic device 804 may identify the information related to the file included in the message received from the electronic device 101. The other electronic device 804 may transmit a file request message (e.g., an HTTP GET request) to the content server 800. According to an embodiment, when receiving an authentication request message (e.g., HTTP 401 AUTHENTICATION REQUIRED) as a response to the file request message, the other electronic device 804 may perform an authentication procedure with the content server 800.

According to various embodiments, the content server 800 may transmit at least one file to the other electronic device 804 based on the request message received from the other electronic device 804 (operation 1615). According to an embodiment, when succeeding in the authentication of the other electronic device 804, the content server 800 may identify at least one file required by the other electronic device 804, based on an address related to a file (or a thumbnail) included in the request message received from the other electronic device 804. According to an embodiment, when not requiring the authentication of the other electronic device 804, the content server 800 may identify at least one file required by the other electronic device 804, based on an address related to a file (or a thumbnail) included in the request message received from the other electronic device 804.

According to various embodiments, the other electronic device 804 may display the at least one file (or thumbnail) received from the content server based on the file function detected in the message (operation 1617). According to an embodiment, when supporting the file function detected in the message, the other electronic device 804 may display at least one file in at least a part of a user interface related to a messenger application program, in a form corresponding to the file function.

According to an embodiment, when not supporting the file function detected in the message, the other electronic device 804 may display, in at least a part of a user interface related to a messenger application program, information related to use restriction on the file function.

According to an embodiment, when not supporting the file function detected in the message, the other electronic device 804 may select another file function related to the file function detected in the message. The other electronic device 804 may display at least one file in at least a part of a user interface related to a messenger application program in a form corresponding to the other file function. For example, the other file function may be selected based on a use history of the file function and/or the similarity of the file function.

According to various embodiments, an operating method of an electronic device (e.g., the electronic device 110 in FIG. 1 or 2) may include an operation of transmitting, to a first server, at least one file to be transmitted to another electronic device, an operation of receiving, from the first server, a message body related to the at least one file, an operation of generating a message by adding, to the message body, information related to at least one file function, and an operation of transmitting the message to the other electronic device.

According to various embodiments, the first server may include a hypertext transfer protocol (HTTP) content server.

According to various embodiments, the message body may include at least one of address information related to the at least one file, information related to the size of the file or information related to the type of file.

According to various embodiments, the operation of generating the message may include an operation of generating the message by adding, to a name space of the message body, the information related to the at least one file function.

According to various embodiments, the operation of generating the message may include an operation of generating the message by adding, to the message body, the information related to the at least one file function in the form of a file tag.

According to various embodiments, the operation of generating the message may include an operation of generating the message by adding, to the message body, the information related to the at least one file function in the form of a file information tag.

According to various embodiments, the operating method may further include an operation of identifying the capability of the other electronic device through an RCS application server or a presence server, an operation of identifying at least one file function supported by the other electronic device among multiple file functions supported by the electronic device based on the capability of the other electronic device, and an operation of displaying a file function list including the at least one file function supported by the other electronic device.

According to various embodiments, the operating method may further include an operation of selecting at least one file function related to the at least one file in the displayed file function list.

According to various embodiments, the message may include an IP multimedia subsystem (IMS)-based message.

According to various embodiments, the operation of transmitting the message may include an operation of transmitting the message to the other electronic device through a second server.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. An electronic device comprising:
a display;
communication circuitry; and
a processor operatively connected to the communication circuitry,
wherein the processor is configured to:
  transmit, to a first server, at least one file to be transmitted to another electronic device through the communication circuitry,
  receive, from the first server, a message body related to the at least one file,
  identify a capability of the other electronic device through a presence server,
  identify at least one file function supported by the other electronic device among multiple file function supported by the electronic device based on the capability of the other electronic device, wherein the at least one file function includes at least one file transfer function,
  display, through the display, a file function list comprising the at least one file function supported by the other electronic device,
  select the at least one file function related to the at least one file in a file function list displayed on the display,
  generate a message by adding, to the message body, information related to the selected at least one file function, and
  transmit the message to the other electronic device through the communication circuitry, and
wherein the file function list is discriminatively displayed at least one file function supported by the other electronic device and at least another file function not supported by the other electronic device.

2. The electronic device of claim 1, wherein the first server comprises a hypertext transfer protocol (HTTP) content server.

3. The electronic device of claim 1, wherein the processor is further configured to receive, from the first server, the message body comprising at least one of address information related to the at least one file, information related to a size of the file or information related to a type of file.

4. The electronic device of claim 1, wherein the processor is further configured to add, to a name space of the message body, the information related to the at least one file function.

5. The electronic device of claim 1, wherein the processor is further configured to add, to the message body, the information related to the at least one file function in a form of a file tag or a form of a file information tag.

6. The electronic device of claim 1, wherein the message comprises an internet protocol (IP) multimedia subsystem (IMS)-based message.

7. The electronic device of claim 1, wherein the processor is further configured to transmit the message to the other electronic device through a second server.

8. A method of operating an electronic device, the method comprising:
- transmitting, to a first server, at least one file to be transmitted to another electronic device;
- receiving, from the first server, a message body related to the at least one file;
- identifying a capability of the other electronic device through a presence server;
- identifying at least one file function supported by the other electronic device among multiple file functions supported by the electronic device based on the capability of the other electronic device, wherein the at least one file function includes at least one file transfer function;
- displaying a file function list comprising the at least one file function supported by the other electronic device;
- selecting the at least one file function related to the at least one file in a file function list displayed on the display;
- generating a message by adding, to the message body, information related to the selected at least one file function; and
- transmitting the message to the other electronic device,
- wherein the file function list is discriminatively displayed at least one file function supported by the other electronic device and at least another file function not supported by the other electronic device.

9. The method of claim 8, wherein the first server comprises a hypertext transfer protocol (HTTP) content server.

10. The method of claim 8, wherein the message body comprises at least one of address information related to the at least one file, information related to a size of the file or information related to a type of file.

11. The method of claim 8, wherein the generating of the message comprises generating the message by adding, to a name space of the message body, the information related to the at least one file function.

12. The method of claim 8, wherein the generating of the message comprises generating the message by adding, to the message body, the information related to the at least one file function in a form of a file tag or a form of a file information tag.

13. The method of claim 8, wherein the at least one file function comprises at least one of a timer file transfer function or a restrict file transfer function.

14. The method of claim 8, wherein the at least one file function comprises at least one of a deadline setting function, a copy restriction function, or a bundle transfer function.

15. The method of claim 8, wherein the message comprises an IP multimedia subsystem (IMS)-based message.

16. The method of claim 8, wherein the transmitting of the message comprises transmitting the message to the other electronic device through a second server.

* * * * *